United States Patent
Singh et al.

(10) Patent No.: US 12,554,639 B2
(45) Date of Patent: **\*Feb. 17, 2026**

(54) REAL-TIME DYNAMIC CACHING PLATFORM FOR METAVERSE ENVIRONMENTS USING NON-FUNGIBLE TOKENS

(71) Applicant: Bank of America Corporation, Charlotte, NC (US)

(72) Inventors: Shailendra Singh, Maharashtra (IN); Vinod Maghnani, Gurugram (IN); Ashish Kumar Dwivedi, Gurugram (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/581,716

(22) Filed: Feb. 20, 2024

(65) Prior Publication Data
US 2024/0193082 A1    Jun. 13, 2024

Related U.S. Application Data

(63) Continuation of application No. 17/990,889, filed on Nov. 21, 2022, now Pat. No. 11,954,030.

(51) Int. Cl.
*G06F 12/0802* (2016.01)
*G06N 20/00* (2019.01)

(52) U.S. Cl.
CPC ......... *G06F 12/0802* (2013.01); *G06N 20/00* (2019.01); *G06F 2212/60* (2013.01)

(58) Field of Classification Search
CPC ... G06N 20/00; G06F 3/0659; G06F 12/0802; G06F 3/067; G06F 3/0601; G06F 3/0656;
(Continued)

(56) References Cited

U.S. PATENT DOCUMENTS

| 7,996,164 B2 | 8/2011 | Hamilton, II et al. |
| 8,199,145 B2 | 6/2012 | Hamilton, II et al. |

(Continued)

FOREIGN PATENT DOCUMENTS

CN    109886742 A  *  6/2019

OTHER PUBLICATIONS

Li et al., "Efficient cooperative cache management for latency-aware data intelligent processing in edge environment", Future Generation Computer Systems 123 (Apr. 2021) p. 48-67.*

*Primary Examiner* — Jared I Rutz
*Assistant Examiner* — Chen Gu
(74) *Attorney, Agent, or Firm* — Banner & Witcoff, Ltd.

(57) ABSTRACT

Aspects of the disclosure relate to a dynamic caching platform. The dynamic caching platform may train a machine learning model based on historical complexity score information. The dynamic caching platform may receive information streams from a client metaverse device and a metaverse host system. The dynamic caching platform may generate a complexity score based on the interaction information streams using the machine learning model. The dynamic caching platform may compare the complexity score to complexity thresholds. Based on the comparison, the dynamic caching platform may identify caching rules. The dynamic caching platform may cache interaction information based on the caching rules. The dynamic caching platform may update the complexity score using the machine learning model. The dynamic caching platform may update the caching rules based on the updated complexity score. The dynamic caching platform may cache interaction information based on the updated caching rules.

20 Claims, 14 Drawing Sheets

(58) Field of Classification Search
CPC ........... G06F 16/24552; G06F 2212/60; H04L 67/568
See application file for complete search history.

(56) References Cited

U.S. PATENT DOCUMENTS

| | | |
|---|---|---|
| 8,214,750 B2 | 7/2012 | Hamilton, II et al. |
| 8,947,431 B2 | 2/2015 | Li et al. |
| 9,268,285 B2 | 2/2016 | Sugiyama et al. |
| 11,075,891 B1 | 7/2021 | Long et al. |
| 11,494,760 B1 | 11/2022 | Khan |
| 2009/0267948 A1 | 10/2009 | Finn et al. |
| 2010/0005423 A1 | 1/2010 | Finn et al. |
| 2010/0306652 A1* | 12/2010 | Bolger .................... G06F 16/38 715/706 |
| 2011/0055367 A1 | 3/2011 | Dollar |
| 2014/0241625 A1 | 8/2014 | Suzuki |
| 2014/0281850 A1 | 9/2014 | Prakash et al. |
| 2018/0293697 A1 | 10/2018 | Ray et al. |
| 2020/0210333 A1 | 7/2020 | Ramini et al. |
| 2020/0327548 A1 | 10/2020 | Hartard |
| 2021/0297258 A1 | 9/2021 | Keith, Jr. |
| 2022/0058635 A1 | 2/2022 | Yantis et al. |
| 2022/0094550 A1 | 3/2022 | Keith, Jr. |
| 2022/0294630 A1 | 9/2022 | Collen |
| 2022/0309540 A1 | 9/2022 | Blaikie, III et al. |
| 2022/0318233 A1 | 10/2022 | Martinez |
| 2022/0345537 A1 | 10/2022 | Samms et al. |
| 2022/0366494 A1* | 11/2022 | Cella ........................ H04L 9/50 |

\* cited by examiner

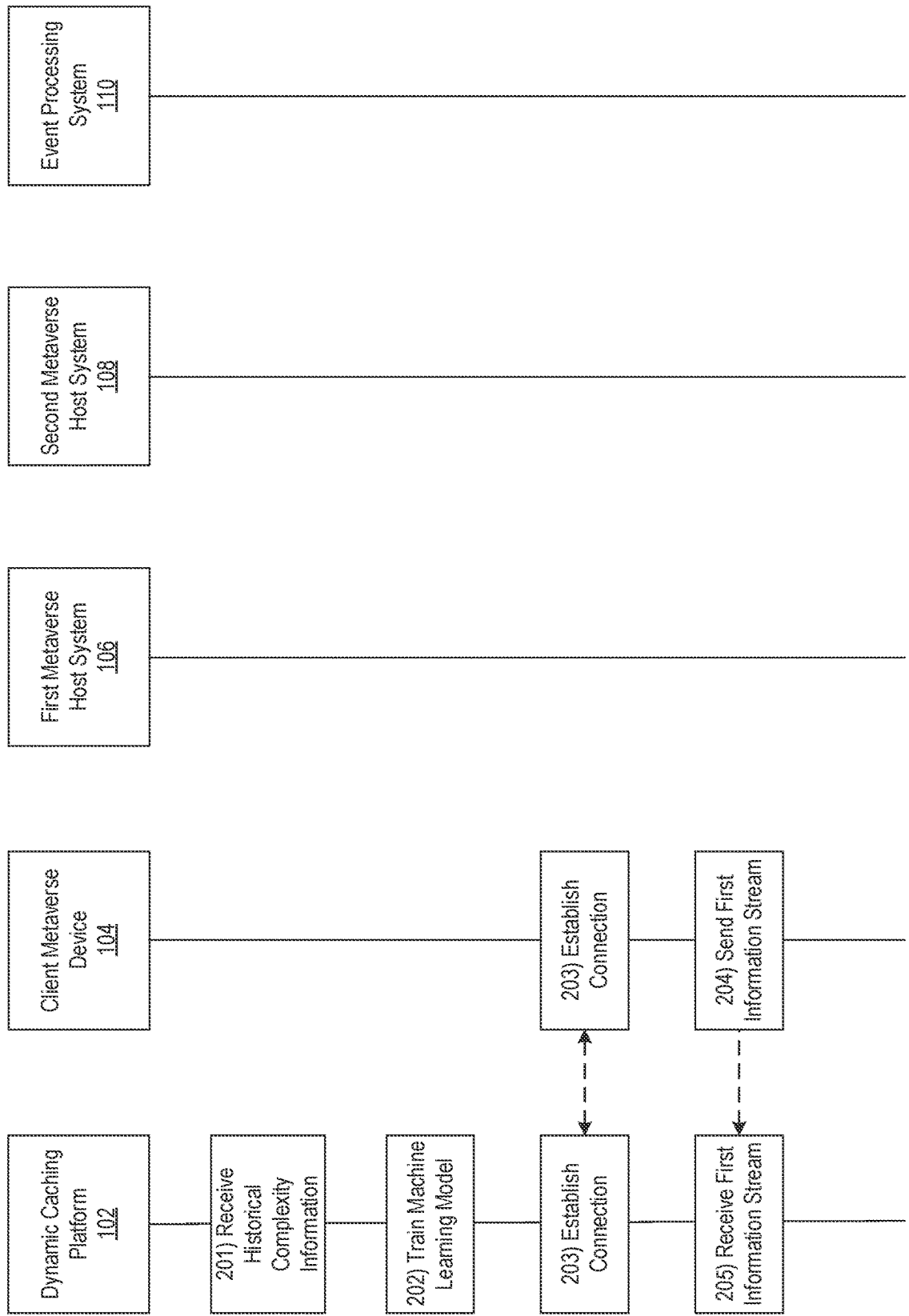

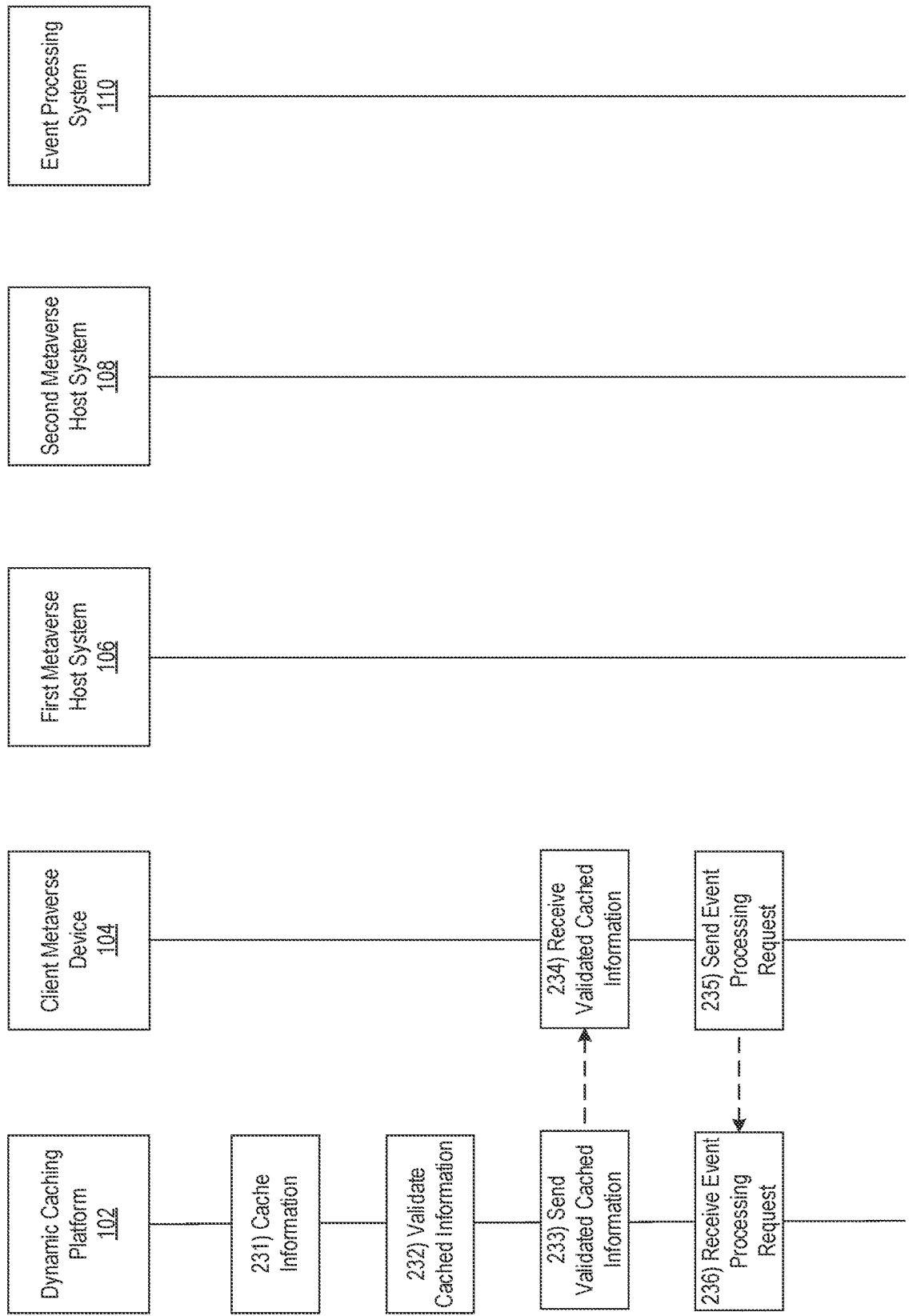

REAL-TIME DYNAMIC CACHING PLATFORM FOR METAVERSE ENVIRONMENTS USING NON-FUNGIBLE TOKENS

CROSS-REFERENCE TO RELATED APPLICATIONS

This application is a continuation of and claims priority to co-pending U.S. patent application Ser. No. 17/990,889 filed on Nov. 21, 2022, and entitled "Real-time Dynamic Caching Platform for Metaverse Environments Using Non-Fungible Tokens," which is hereby incorporated by reference in its entirety.

BACKGROUND

Aspects of the disclosure relate to real-time dynamic information caching for metaverse environments using non-fungible tokens (NFTs). In some instances, one individual or multiple individuals may access a metaverse environment managed by a metaverse host. In some cases, the individual or individuals may require rapid, efficient information caching during their metaverse session. The information to be cached may be necessary to complete one or more actions in the metaverse environment, and caching this information only after the user requests it may lead to delays in service. Additionally, as large numbers of individuals start using the metaverse environment there may be a constraint on the performance and stability of metaverse services (e.g., network constraints, bandwidth constraints, and/or other constraints). Accordingly, it may be important to improve the interaction information caching process to optimize the user experience and prevent service delays.

SUMMARY

Aspects of the disclosure provide effective, efficient, scalable, and convenient technical solutions that address and overcome the technical problems associated with information caching in the metaverse. In accordance with one or more embodiments of the disclosure, a computing platform with at least one processor, a communication interface, and memory storing computer-readable instructions may train a machine learning model based on historical complexity score information to output complexity score information (e.g., a complexity score) in response to input of interaction information. The computing platform may receive a first information stream from a client metaverse device. The first information stream may comprise user-specific interaction information. The computing platform may also receive a second information stream from a first metaverse host system. The second information stream may comprise interaction information between the user and the metaverse environment.

The computing platform may input the first information stream and the second information stream into the machine learning model to output a complexity score. The computing platform may compare the complexity score to one or more complexity thresholds, wherein the one or more complexity thresholds define threshold ranges and stored caching rules correspond to each threshold range. Based on the comparison, the computing platform may identify caching rules corresponding to the complexity score. The computing platform may cache interaction information between the user and the metaverse environment based on the identified caching rules. The computing platform may refine the machine learning model based on inputting the complexity score and interaction information.

In one or more examples, the computing platform may also identify that an event processing request has been received from the user within the metaverse environment. The computing platform may send one or more commands directing an event processing system to process an event based on validation of the cached interaction information. Sending one or more commands directing the event processing system to process the requested event may cause the event processing system to process the requested event.

In one or more instances, the computing platform may receive a third information stream from a second metaverse host system. The computing platform may input the third information stream into the machine learning model to update the complexity score. The computing platform may update the complexity score based on the third information stream and using the machine learning model. The computing platform may identify updated caching rules based on the complexity score and using the machine learning model. The computing platform may also modify the cached interaction information between the user and the metaverse environment based on the updated caching rules.

In one or more examples, the first metaverse host system may comprise a first metaverse session and a first metaverse environment. The second metaverse host system may comprise a second metaverse session and a second metaverse environment. In one or more instances, the computing platform may continuously request updated information streams from the first metaverse host system and the second metaverse host system. The complexity score and the updated caching rules may be continuously updated based on the updated information streams. In one or more instances, the third information stream may similarly comprise one or more of: positional characteristics of objects, rotational angles of objects, object dimensions, object mass, object friction, object pixel density, object color, object texture, object lighting, object behavior, metaverse temporal properties, metaverse user preferences, device capabilities, user meta information, account information, biometric information, or authentication information. In one or more examples, the historical complexity score information may comprise one or more of: complexity scores, complexity thresholds, metaverse user preferences, metaverse host preferences, device capabilities, user metainformation, account information, biometric information, or authentication information. In one or more instances, the first information stream may comprise one or more of: avatar mesh information, metaverse spatial properties, metaverse temporal properties, metaverse user preferences, device capabilities, user metainformation, account information, biometric information, or authentication information.

In one or more examples, the second information stream may comprise one or more of: positional characteristics of objects, rotational angles of objects, object dimensions, object mass, object friction, object pixel density, object color, object texture, object lighting, object behavior, metaverse temporal properties, metaverse user preferences, device capabilities, user metainformation, account information, biometric information, or authentication information.

In one or more examples, the computing platform may generate an NFT certificate corresponding to the complexity score. The computing platform may send the NFT certificate to the client metaverse device. In one or more instances, the first client metaverse device may comprise one or more of: a virtual reality device, an augmented reality device, a computer device, or a smartphone device.

In one or more instances, caching the interaction information may comprise storing the interaction information on the client metaverse device. In one or more examples, the computing platform may pair to an edge metaverse device. The computing platform may cache the interaction information using edge caching, based on the caching rules. In one or more instances, the computing platform may identify a new edge metaverse device corresponding to a new edge metaverse environment, based on user input requesting a new metaverse environment. The computing platform may pair to the new edge metaverse device and cache the interaction information on the new edge metaverse device using edge caching and based on the identified caching rules.

In one or more examples, the caching rules may comprise one more of: directions to cache interaction information at a particular time, directions to cache interaction information at a particular location, directions to cache interaction information with a particular device, directions to utilize edge caching, directions to cache interaction information up to a particular capacity, or directions to cache interaction information for a particular use case.

In one or more instances, the computing platform may identify an edge server and cache the interaction information on the edge server based on the identified caching rules and using edge caching. In one or more examples, the updated caching rules may be determined by a smart contract corresponding to the second metaverse host system. In one or more instances, the computing platform may send one or more commands directing the client metaverse device to display a user interface, based on validation of the cached interaction information. The one or more commands may cause the client metaverse device to display the user interface.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2H depict an illustrative event sequence for real-time dynamic caching for metaverse environments using NFTs in accordance with one or more example embodiments;

DETAILED DESCRIPTION

Figure 1A:
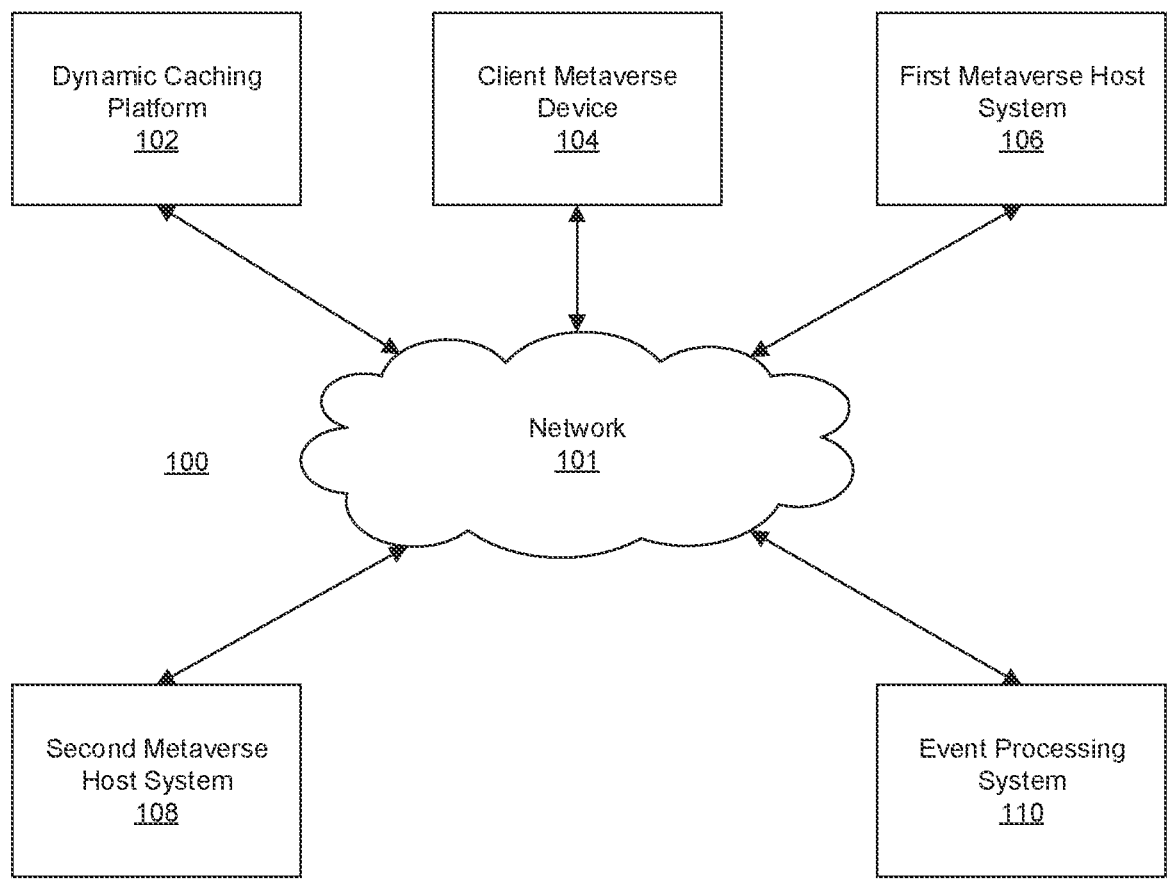
FIGS. 1A-1B depict an illustrative computing environment for real-time dynamic caching for metaverse environments using NFTs in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to a system for real-time dynamic caching for metaverse environments using NFTs. Metaverse technology may allow users to interact with real-world institutions and systems (e.g., a financial institution, or other institution) through a metaverse environment (e.g., a virtual reality interface, or other interface). Users may interact with the metaverse environment through event processing requests that simulate real-world interactions (e.g., a payment processing request for an account managed by a financial institution, and/or other interactions). As large numbers of users (e.g., customers, employees, and/or other individuals) start using metaverse technology in general and/or a particular metaverse environment, the amount of information user interactions require may create a strain on performance of the metaverse services (which may, e.g., lead to less stable services). Currently, the information required to perform metaverse services is typically cached only after the user interacts with the environment (e.g., after the user's metaverse avatar requests payment processing or otherwise interacts with the environment). This can lead to a slowdown in services when multiple users are draining metaverse environment resources. Real-time dynamic caching of information may allow for continuous data caching throughout the user's metaverse session that may preempt user requests and reduce the time necessary for the metaverse environment to complete user requests after they are made.

Accordingly, described herein is an artificial intelligence (AI) supported real-time dynamic caching platform that may be used to manage data caching in an optimal way through the use of NFTs. The dynamic caching platform may manage the cache for the user while the user is interacting with metaverse spatial environments (e.g., one managed by a metaverse host, such as a financial institution) or traversing from one metaverse environment to another. The dynamic caching platform may use a machine learning model to analyze interaction information from the user's avatar mesh and the metaverse environment itself to generate a multi-factored complexity score correlating to the metaverse environment. For example, the machine learning model may analyze spatial and/or temporal properties relating to the user's metaverse interactions (e.g., the user avatar's movement in the metaverse environment and/or the length of time spent in the environment) to generate a complexity score representing the complexity of the user's interaction with the metaverse environment. The dynamic caching platform may then generate NFTs corresponding to the complexity score and send those NFTs to the metaverse host system. The metaverse host system may provide the dynamic caching platform with caching rules corresponding to different complexity thresholds that define threshold ranges for the complexity score.

Accordingly, the dynamic caching platform may compare the complexity score to the complexity thresholds and identify, based on the comparison, caching rules corresponding to the complexity score. The dynamic caching platform may implement these caching rules to cache interaction information likely to be needed by the user based on their interactions with the metaverse environment. The dynamic caching platform may continue to update the complexity score and the corresponding NFTs in real-time as the user interacts further with the environment, and use the updated complexity score to identify updated caching rules as the complexity score shifts between different complexity thresholds. In dynamically caching information in real-time based on the user's interactions with the metaverse environment, the dynamic caching platform can ensure more efficient caching of information to increase performance of the metaverse environment. The dynamic caching platform may continue to refine the machine learning model based on the updated caching rules.

Figure 1B:
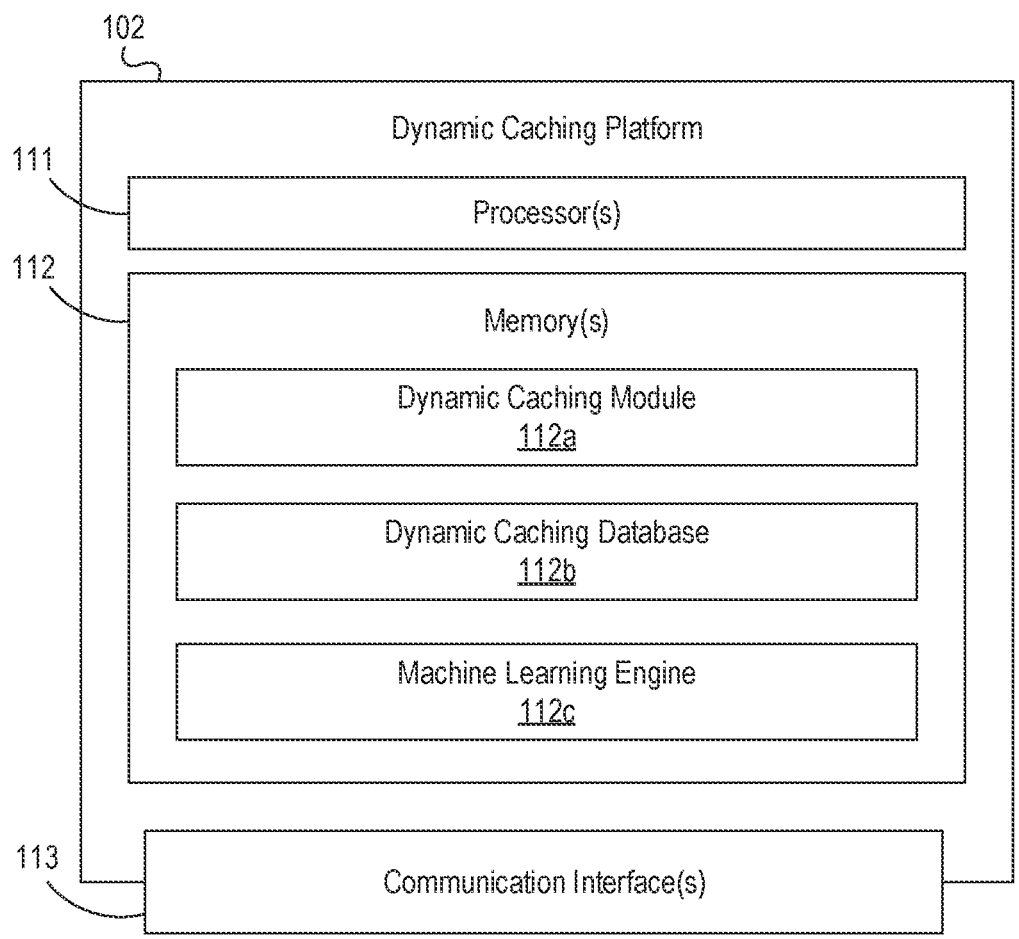

FIGS. 1A-1B depict an illustrative computing environment for real-time dynamic caching for metaverse environments using NFTs in accordance with one or more example embodiments. Referring to FIG. 1A, computing environment 100 may include one or more computer systems. For example, computing environment 100 may include a dynamic caching platform 102, a client metaverse device 104, a first metaverse host system 106, a second metaverse host system 108, and an event processing system 110.

As described further below, dynamic caching platform 102 may be a computer system that includes one or more computing devices (e.g., servers, server blades, or the like) and/or other computer components (e.g., processors, memories, communication interfaces) that may be used to configure and train one or more machine learning models. For example, the dynamic caching platform 102 may train the one or more machine learning models to generate a complexity score corresponding to interaction information. Additionally or alternatively, dynamic caching platform 102 may train the one or more machine learning models to identify updated caching rules corresponding to changes in the complexity score and based on complexity thresholds. In some instances, dynamic caching platform 102 may be controlled or otherwise maintained by an enterprise organization, such as a financial institution or other institution.

Client metaverse device 104 may be a computing device configured for metaverse interaction (e.g., virtual reality device, augmented reality device, laptop computer, desktop computer, mobile device, tablet, smartphone, server, server blade, and/or other device) and/or other data storing component (e.g., processors, memories, communication interfaces, databases) that may be used to transfer data between users and/or perform other user functions (e.g., interacting with metaverse environments, providing data for an event processing request, storing data, and/or other functions). In one or more instances, client metaverse device 104 may correspond to a first user (who may, e.g., be an employee or client of the enterprise organization such as a financial institution). In one or more instances, the client metaverse device 104 may be configured to communicate with one or more systems (e.g., dynamic caching platform 102 and/or other systems) to perform a data transfer, cache data, perform machine learning model configuration/training, and/or to perform other functions. In some instances, the client metaverse device 104 may be configured to display one or more graphical user interfaces (e.g., validated information interfaces, event confirmation interfaces, and/or other interfaces).

First metaverse host system 106 may be a computing device configured for metaverse interaction (e.g., virtual reality device, augmented reality device laptop computer, desktop computer, mobile device, tablet, smartphone, server, server blade, and/or other device) and/or other data storing component (e.g., processors, memories, communication interfaces, databases), similar to client metaverse device 104, which may be used to transfer data between users and/or perform other user functions (e.g., hosting and/or generating a metaverse environment, providing complexity thresholds, providing caching rules, and/or other functions). In one or more instances, first metaverse host system 106 may correspond to a second user (who may, e.g., be an employee or client of an enterprise organization such as a financial institution). In one or more instances, the second user may be different from the first user. In one or more instances, the first metaverse host system 106 may be configured to communicate with one or more systems (e.g., dynamic caching platform 102 and/or other systems) to perform data transfer, perform machine learning model configuration/training, provide complexity thresholds, provide caching rules, and/or to perform other functions. In some examples, the first metaverse host system 106 may host a first metaverse session and a first metaverse environment.

Second metaverse host system 108 may be a computing device configured for metaverse interaction (e.g., virtual reality device, augmented reality device laptop computer, desktop computer, mobile device, tablet, smartphone, server, server blade, and/or other device) and/or other data storing component (e.g., processors, memories, communication interfaces, databases), similar to client metaverse device 104 and first metaverse host system 106, which may be used to transfer data between users and/or other user functions (e.g., hosting and/or generating a metaverse environment, providing complexity thresholds, providing caching rules, and/or other functions). In one or more instances, second metaverse host system 108 may correspond to a third user (who may, e.g., be an employee or client of an enterprise organization such as a financial institution). In one or more instances, the third user may be different from the first user and/or the second user. In one or more examples, the second metaverse host system 108 may be configured to communicate with one or more systems (e.g., dynamic caching platform 102 and/or other systems) to perform data transfer, perform machine learning model configuration/training, provide complexity thresholds, provide caching rules, and/or to perform other functions. In one or more instances, second metaverse host system 108 may host a second metaverse session different from the first metaverse session and a second metaverse environment different from the first metaverse environment.

Event processing system 110 may be one or more computer devices (e.g., servers, server blades, or the like) and/or other computer components (e.g., processors, memories, communication interfaces) that may be used to process event processing requests (e.g., transaction requests, fund transfer requests, withdrawal requests, payment processing requests, and/or other requests). In some instances, event processing system 110 may be configured to communicate with dynamic caching platform 102 to receive and process event processing requests.

Computing environment 100 also may include one or more networks, which may interconnect dynamic caching platform 102, client metaverse device 104, first metaverse host system 106, second metaverse host system 108, and event processing system 110. For example, computing environment 100 may include a network 101 (which may interconnect, e.g., dynamic caching platform 102, client metaverse device 104, first metaverse host system 106, second metaverse host system 108, and event processing system 110).

In one or more arrangements, dynamic caching platform 102, client metaverse device 104, first metaverse host system 106, second metaverse host system 108, and event processing system 110 may be any type of computing device capable of sending and/or receiving requests and processing the requests accordingly. For example, dynamic caching platform 102, client metaverse device 104, first metaverse host system 106, second metaverse host system 108, event processing system 110, and/or the other systems included in computing environment 100 may, in some instances, be and/or include virtual reality devices, augmented reality devices, server computers, desktop computers, laptop computers, tablet computers, smart phones, or the like that may include one or more processors, memories, communication interfaces, storage devices, and/or other components. As noted above, and as illustrated in greater detail below, any and/or all of dynamic caching platform 102, client metaverse device 104, first metaverse host system 106, second metaverse host system 108, and event processing system 110, may, in some instances, be special-purpose computing devices configured to perform specific functions.

Referring to FIG. 1B, dynamic caching platform 102 may include one or more processors 111, memory 112, and communication interface 113. A data bus may interconnect processor 111, memory 112, and communication interface 113. Communication interface 113 may be a network interface configured to support communication between dynamic caching platform 102 and one or more networks (e.g., network 101, or the like). Communication interface 113 may be communicatively coupled to the processor 111. Memory 112 may include one or more program modules having instructions that, when executed by processor 111, cause dynamic caching platform 102 to perform one or more functions described herein and/or one or more databases that may store and/or otherwise maintain information which may be used by such program modules and/or processor 111. In some instances, the one or more program modules and/or databases may be stored by and/or maintained in different memory units of dynamic caching platform 102 and/or by different computing devices that may form and/or otherwise make up dynamic caching platform 102. For example, memory 112 may have, host, store, and/or include dynamic caching module 112a, dynamic caching database 112b, and machine learning engine 112c.

Dynamic caching module 112a may have instructions that direct and/or cause dynamic caching platform 102 to perform real-time dynamic caching for metaverse environments using NFTs. Dynamic caching database 112b may have instructions causing dynamic caching platform 102 to store NFTs, complexity scores, complexity thresholds, and caching rules (that may, e.g., be used to perform real-time dynamic caching for interaction information using NFTs). Machine learning engine 112c may contain instructions causing dynamic caching platform 102 to train and/or implement a machine learning model (that may, e.g., be used to perform real-time dynamic caching for metaverse environments using NFTs). In some instances, machine learning engine 112c may be used by dynamic caching platform 102 and/or dynamic caching module 112a to refine and/or otherwise update methods for real-time dynamic caching, and/or other methods described herein.

Figure 2B:
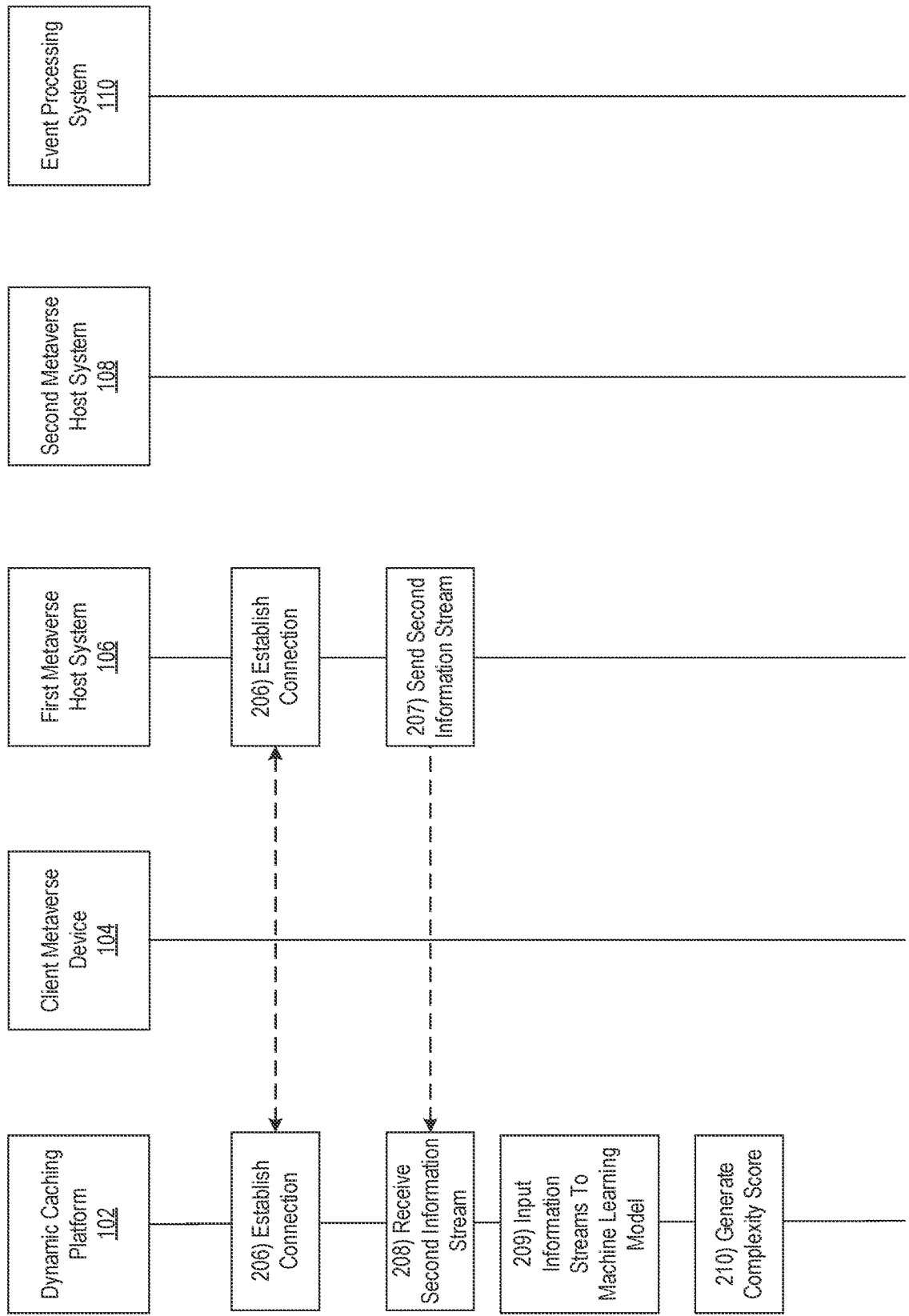

FIGS. 2A-2H depict an illustrative event sequence for real-time dynamic caching for metaverse environments using NFTs in accordance with one or more example embodiments. Referring to FIG. 2A, at step 201, dynamic caching platform 102 may receive historical complexity score information (e.g., caching rules corresponding to a prior metaverse session, prior complexity scores corresponding to a particular metaverse session and/or metaverse environment, and/or other information). For example, dynamic caching platform 102 may receive the historical complexity score information from client device memory (e.g., the memory of client metaverse device 104), metaverse host system memory (e.g., the memory of first metaverse host system 106), and/or other memory/sources. In some instances, the dynamic caching platform 102 may receive the historical complexity score information via a historical NFT certificate containing the historical complexity score information.

At step 202, the dynamic caching platform may train a machine learning model. In some instances, the dynamic caching platform 102 may configure and/or otherwise train the machine learning model based on the historical complexity score information received at step 201. In some instances, to configure and/or otherwise train the machine learning model, dynamic caching platform 102 may process all (or a subset) of the historical complexity score information by applying natural language processing, natural language understanding, and/or other processing techniques/algorithms (e.g., supervised machine learning techniques) to generate and store one or more classification models.

For example, in configuring and/or otherwise training the machine learning model, dynamic caching platform 102 may apply natural language processing to historical complexity score information dynamic caching platform 102 has previously used to cache interaction information. For instance, the dynamic caching platform 102 may identify that a client device (e.g., client metaverse device 104) historically corresponded to a particular complexity score when interacting with a particular metaverse environment. Additionally or alternatively, the dynamic caching platform 102 may mine the historical complexity score information to determine caching rules corresponding to a particular metaverse environment. For example, based on the historical complexity score information the dynamic caching platform 102 may identify that all client devices interacting with a particular metaverse environment cache client account login information when interacting with that particular metaverse environment.

At step 203, client metaverse device 104 may establish a connection with dynamic caching platform 102. For example, client metaverse device 104 may establish a first wireless data connection with the dynamic caching platform 102 to link the dynamic caching platform 102 with the client metaverse device 104 (e.g., in preparation for sending a first information stream). In some instances, the client metaverse device 104 may identify whether or not a connection is already established with the dynamic caching platform 102. If a connection is already established with the dynamic caching platform 102, the client metaverse device 104 might not re-establish the connection. If a connection is not yet established with the dynamic caching platform 102, the client metaverse device 104 may establish the first wireless data connection as described above. In one or more instances, in establishing a connection with dynamic caching platform 102 the client metaverse device 104 may request access to a metaverse environment (e.g., hosted by the first metaverse host system 106) in order to establish the connection.

At step 204, once a connection has been established, the client metaverse device 104 may send a first information stream to the dynamic caching platform 102. For example, the client metaverse device 104 may send the first information stream via the communication interface 113 and while the first wireless data connection is established.

In some instances, in sending the first information stream, the client metaverse device 104 may send avatar mesh information, metaverse spatial properties, metaverse temporal properties, metaverse user preferences, device capabilities, user metainformation, account information, biometric information, authentication information, and/or other information. In some instances, the client metaverse device 104 may have received the first information stream from a user, an employee/client of an enterprise organization (e.g., a financial institution), user avatar interactions with a metaverse environment, and/or other sources. In some instances, the client metaverse device 104 may send the first information stream while a corresponding user (e.g., of the client metaverse device 104) is interacting with a metaverse environment (e.g., hosted by the first metaverse host system 106) via the client metaverse device 104.

At step 205, dynamic caching platform 102 may receive the first information stream from client metaverse device 104. For example, the dynamic caching platform 102 may receive the first information stream via the communication interface 113 and while the first wireless data connection is established.

Referring to FIG. 2B, at step 206, first metaverse host system 106 may establish a connection with dynamic caching platform 102. For example, first metaverse host system 106 may establish a second wireless data connection with the dynamic caching platform 102 to link the dynamic caching platform 102 with the first metaverse host system 106 (e.g., in preparation for sending a second information stream). In some instances, the first metaverse host system 106 may identify whether or not a connection is already established with the dynamic caching platform 102. If a connection is already established with the dynamic caching platform 102, the first meta verse host system 106 might not re-establish the connection. If a connection is not yet established with the dynamic caching platform 102, the first metaverse host system 106 may establish the second wireless data connection as described above.

At step 207, once a connection has been established, the first metaverse host system 106 may send a second information stream to the dynamic caching platform 102. For example, the first metaverse host system 106 may send the second information stream via the communication interface 113 and while the second wireless data connection is established.

In some instances, in sending the second information stream, the first metaverse host system 106 may send positional characteristics of objects, rotational angles of objects, object dimensions, object mass, object friction, object pixel density, object color, object texture, object lighting, object behavior, metaverse temporal properties, metaverse user preferences, device capabilities, user metainformation, account information, biometric information, authentication information and/or other information. In some instances, the first metaverse host system 106 may have received the second information stream from a user, an employee/client of an enterprise organization (e.g., a financial institution), metaverse host rules, and/or other sources. In some instances, the first metaverse host system 106 may send the second information stream while a user (e.g., of the client metaverse device 104) is interacting with a metaverse environment (e.g., hosted by the first metaverse host system 106) via the client metaverse device 104.

At step 208, dynamic caching platform 102 may receive the second information stream from first metaverse host system 106. For example, the dynamic caching platform 102 may receive the second information stream via the communication interface 113 and while the second wireless data connection is established. In some instances, the dynamic caching platform 102 may store the second information stream in internal memory of dynamic caching platform 102, and/or external memory. In some instances, the dynamic caching platform 102 may continuously communicate with the first metaverse host system 106 to request updated information streams in order to update the complexity score and/or to synchronize updated caching rules.

At step 209, the dynamic caching platform 102 may input the first information stream and the second information stream into the machine learning model in order to generate a complexity score. In some instances, the complexity score may be based wholly or in part on the user's interactions with the metaverse environment. For example, users performing an active action (e.g., interacting with a metaverse object, such as a virtual teller managed by a financial institution) may produce a higher complexity score than users performing a passive and/or no action (e.g., leaving a virtual reality avatar in a stationary position). Additionally or alternatively, the complexity score may be based wholly or in part on properties corresponding to the metaverse environment. For example, the complexity score generated may increase or decrease based on the number of active users of the metaverse environment, the resources of the metaverse host system (e.g. first metaverse host system 106), the processing capacity of the client device (e.g. client metaverse device 104), and/or other properties.

At step 210, the dynamic caching platform 102 may generate the complexity score using the machine learning model. In generating the complexity score, the machine learning model may generate the complexity score as an integer value, a decimal value, an alphanumeric representation, a percentage value, and/or other values. In generating the complexity score, the machine learning model may further compare information of the first information stream and the second information stream with the historical complexity score information used to train the model. For example, the machine learning model may identify that the client metaverse device 104 corresponds to a historical complexity score previously generated by dynamic caching platform 102 when interacting with the first metaverse host system 106. In these instances, the machine learning model may generate a complexity score similar or equivalent to the historical complexity score. In some instances, the dynamic caching platform 102 may store the complexity score in internal memory of dynamic caching platform 102, and/or external memory. In some examples, the dynamic caching platform 102 may have previously trained the machine learning model to employ a complexity algorithm to determine the complexity score. In some instances, the complexity algorithm may use some or all of the first information stream and some or all of the second information stream in calculating a complexity score. For example, the dynamic caching platform 102 may execute the following complexity algorithm:

$$\frac{\text{(Number of active users + Number of metaverse objects + User distance to object)}}{\text{(User device processing power)}} = \text{Complexity Score.}$$

It is noted that, although steps 203-210 are illustrated as being performed a single time in sequence, they may, in some instances, be continuously performed so as to dynamically and constantly update the complexity score in real time.

Figure 2C:
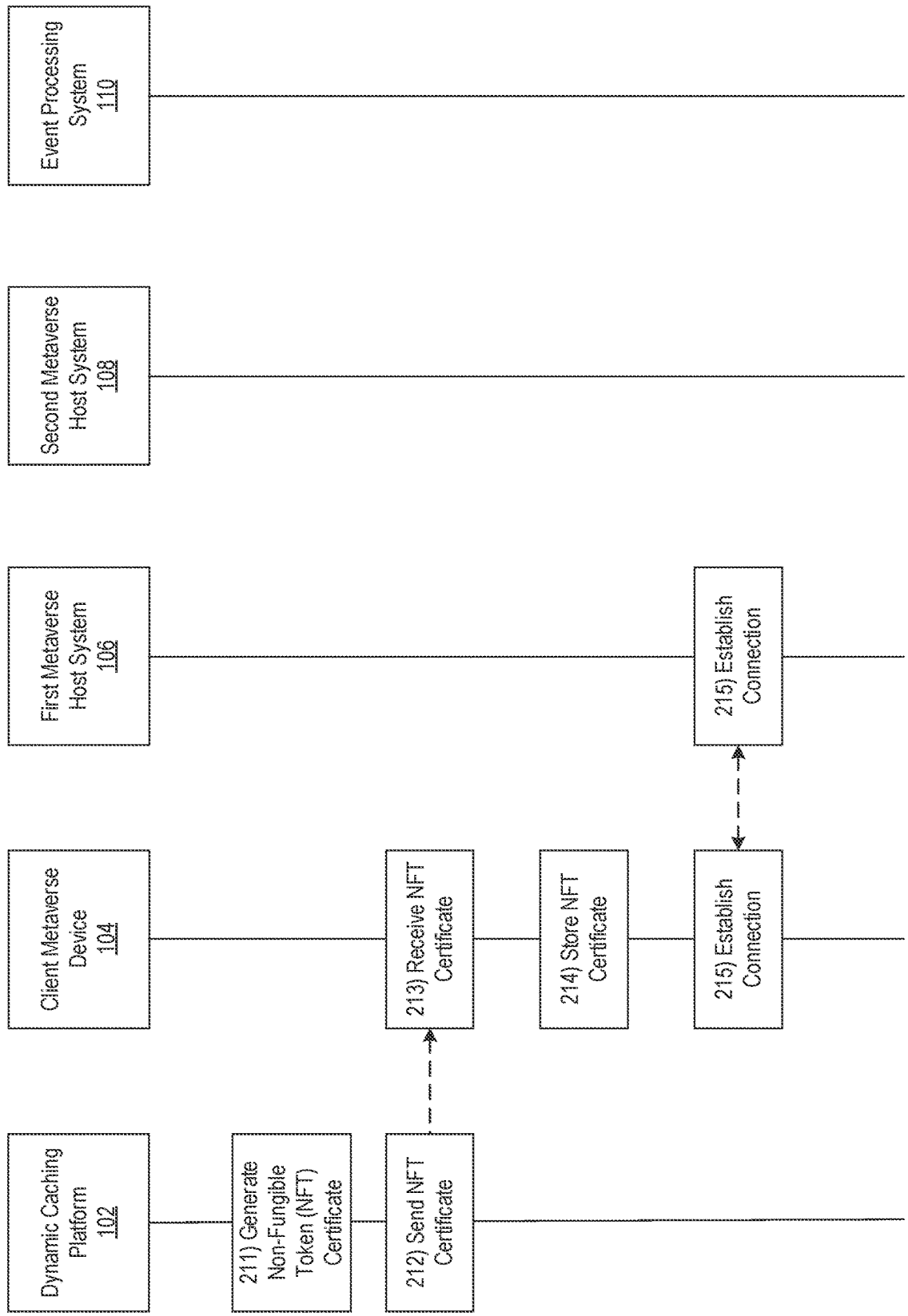

Referring to FIG. 2C, at step 211, the dynamic caching platform 102 may generate an NFT certificate corresponding to the complexity score. In some instances, the NFT certificate may contain a digital tie (e.g., on-chain information corresponding to a distributed ledger system or other link) linking the complexity score to a metaverse user (e.g., the user of client metaverse device 104). Additionally or alternatively, the NFT certificate may contain user identifying information (e.g., account information, profiles, and/or other information) corresponding to the user of the metaverse environment (e.g., the user of client metaverse device 104).

At step 212, the dynamic caching platform 102 may send the NFT certificate to the client metaverse device 104. For example, the dynamic caching platform 102 may send the NFT certificate via the communication interface 113 and while the first wireless data connection is established. In some examples, the dynamic caching platform 102 may additionally send the client metaverse device 104 one or more commands directing the client metaverse device 104 to overwrite a historical NFT certificate (e.g., an NFT certificate generated by dynamic caching platform 102 during a prior metaverse session).

At step 213, the client metaverse device 104 may receive the NFT certificate from the dynamic caching platform 102. For example, the client metaverse device 104 may receive the NFT certificate via the communication interface 113 and while the first wireless data connection is established. In some examples, the client metaverse device 104 may additionally receive one or more commands directing the client metaverse device 104 to overwrite a historical NFT certificate (e.g., an NFT certificate generated by dynamic caching platform 102 during a prior metaverse session).

At step 214, the client metaverse device 104 may store the NFT certificate. The client metaverse device 104 may store the NFT certificate in internal memory of the client metaverse device 104, and/or external memory. In storing the NFT certificate, based on or in response to the one or more commands to overwrite a historical NFT certificate, the client metaverse device 104 may overwrite a historical NFT certificate with the NFT certificate. For example, the client metaverse device 104 may delete a historical NFT certificate and replace the historical NFT certificate with the NFT certificate.

At step 215, client metaverse device 104 may establish a connection with the first metaverse host system 106. For example, client metaverse device 104 may establish a third wireless data connection with the first metaverse host system 106 to link the first metaverse host system 106 with the client metaverse device 104 (e.g., in preparation for sending an NFT certificate). In some instances, the client metaverse device 104 may identify whether or not a connection is already established with the first metaverse host system 106. If a connection is already established with the first metaverse host system 106, the client metaverse device 104 might not re-establish the connection. If a connection is not yet established with the first metaverse host system 106, the client metaverse device 104 may establish the third wireless data connection as described above.

Figure 2D:
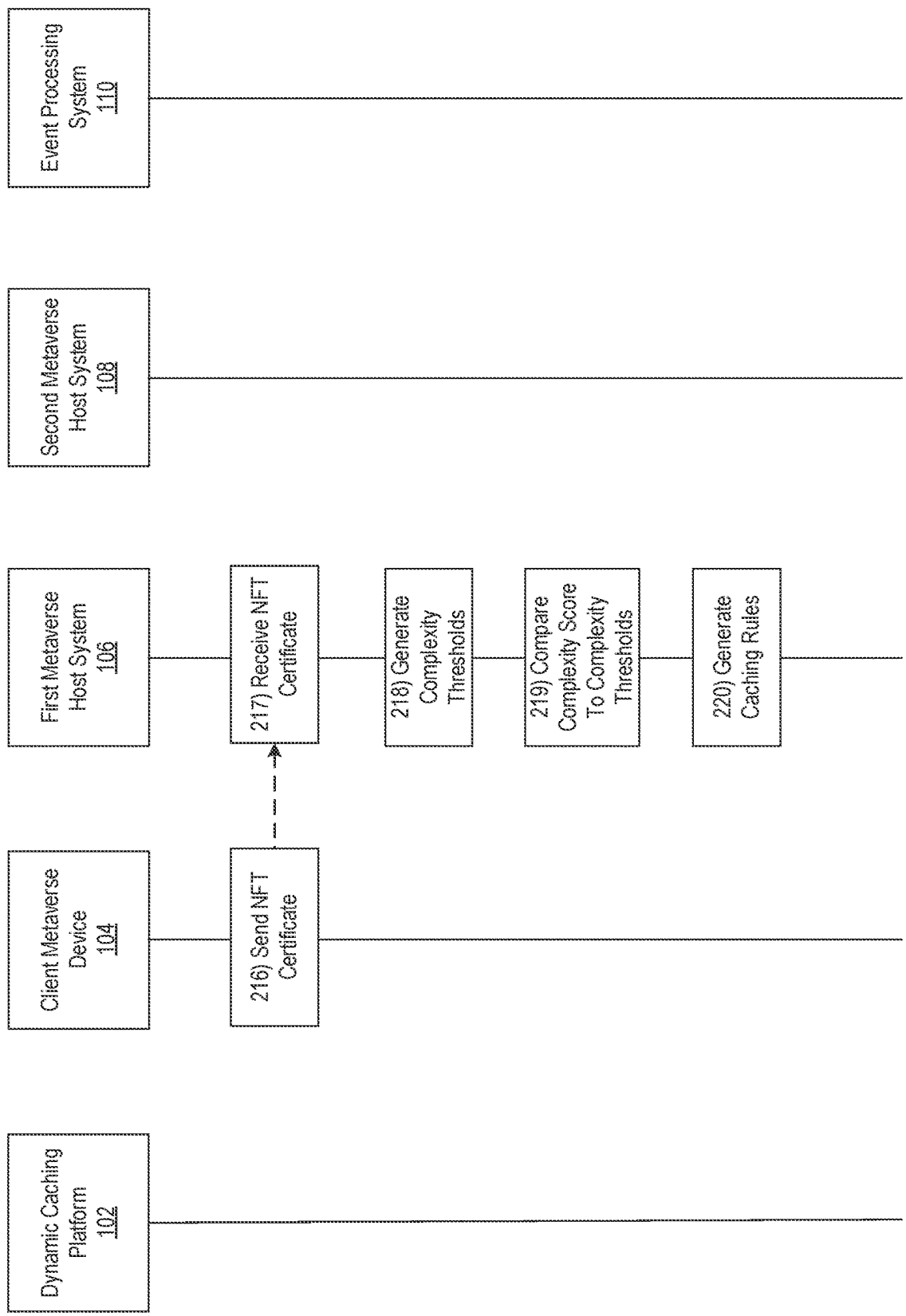

Referring to FIG. 2D, at step 216, the client metaverse device 104 may send the NFT certificate to the first metaverse host system 106. For example, the client metaverse device 104 may send the NFT certificate via a communication interface and while the third wireless data connection is established. In some examples, the client metaverse device 104 may additionally send the first metaverse host system 106 one or more commands directing the first metaverse host system 106 to generate complexity thresholds (e.g., complexity thresholds corresponding to caching rules).

At step 217, the first metaverse host system 106 may receive the NFT certificate from the client metaverse device 104. For example, the first metaverse host system 106 may receive the NFT certificate via a communication interface and while the third wireless data connection is established. In some examples, the first metaverse host system 106 may additionally receive one or more commands directing the first metaverse host system 106 to generate complexity thresholds (e.g., complexity thresholds corresponding to caching rules).

At step 218, the first metaverse host system 106 may generate complexity thresholds. In generating the complexity thresholds, the first metaverse host system 106 may generate the complexity thresholds as a range of integer values, a range of decimal values, a range of alphanumeric representations, a range of percentage values, a set of tiers, and/or other value ranges. In one or more instances, the first metaverse host system 106 may generate the complexity thresholds based on preferences of a metaverse host corresponding to the first metaverse host system 106. For example, the first metaverse host system 106 may generate the complexity thresholds based on the terms of a smart contract (e.g., a self-executing digital agreement) between the client and the metaverse host.

At step 219, the first metaverse host system 106 may compare the complexity score to the complexity thresholds. In comparing the complexity score to the complexity thresholds, the first metaverse host system 106 may identify which complexity threshold the complexity score corresponds to. For example, a complexity score may have a value of 5, while the complexity thresholds may encompass complexity score ranges of 1-3, 4-6, and 7-9. The first metaverse host system 106 may then identify that the complexity score corresponds to the second complexity threshold.

At step 220, the first metaverse host system 106 may generate caching rules corresponding to the complexity thresholds based on the comparison of the complexity score to the complexity thresholds. For example, the first metaverse host system 106 may generate a set of caching rules corresponding to a complexity threshold A, and may generate a second set of caching rules corresponding to a second complexity threshold B. The caching rules may comprise one or more of: directions to cache interaction information at a particular time, directions to cache interaction information at a particular location, directions to cache interaction information with a particular device, directions to utilize edge caching, directions to cache interaction information up to a particular capacity, directions to cache interaction information for a particular use case, and/or other directions. In some instances, in generating the caching rules, the first metaverse host system 106 may receive caching rules from the metaverse host (e.g. through user input, preset preferences, client agreements, buyer/seller agreements, and/or other methods). For example, the first metaverse host system 106 may generate caching rules based on the terms of a smart contract (e.g., a self-executing digital agreement) outlining caching rules for corresponding complexity thresholds.

In some examples, the actions performed by the first metaverse host system 106 at steps 218-220 may alternatively be performed by the dynamic caching platform 102. For example, the dynamic caching platform 102 may generate caching rules based on metaverse client preferences, metaverse host preferences, preset caching rules, and/or other sources. Additionally or alternatively, the dynamic caching platform 102 may monitor the first metaverse host system 106 for preferences of the metaverse host and generate the complexity thresholds based on the preferences. Additionally or alternatively, the dynamic caching platform 102 may compare the complexity score to complexity thresholds generated by a metaverse host system (e.g., first metaverse host system 106) during a previous metaverse session.

Figure 2E:
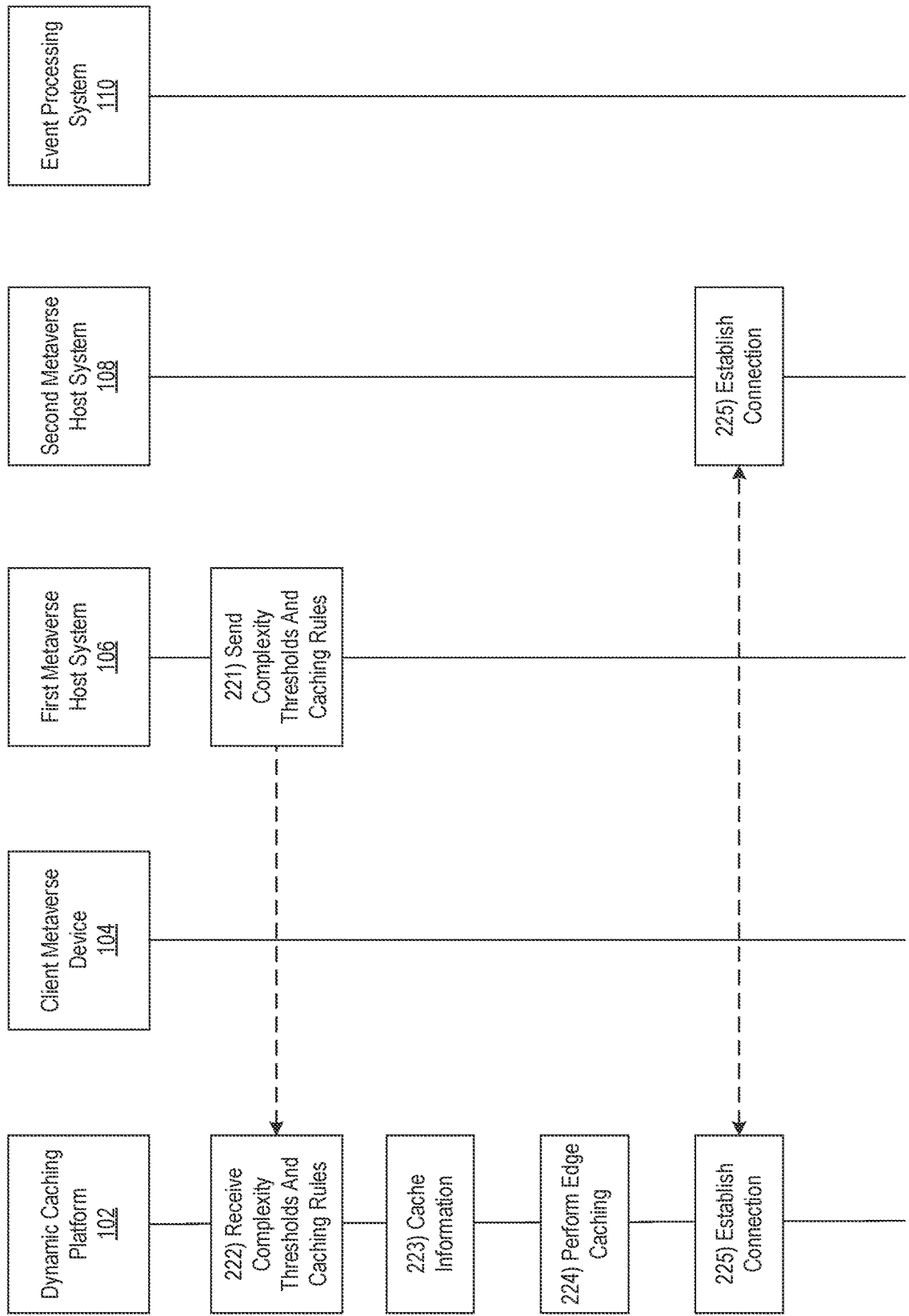

Referring to FIG. 2E, at step 221 the first metaverse host system 106 may send the complexity thresholds and the corresponding caching rules to the dynamic caching platform 102. For example, first metaverse host system 106 may send the complexity thresholds and the corresponding caching rules via the communication interface 113 and while the second wireless data connection is established. In some instances, the first metaverse host system 106 may additionally send one or more commands directing the dynamic caching platform 102 to cache interaction information (e.g., user identification information, authentication information, account information, biometric information, and/or other information) according to the caching rules. In some instances, the dynamic caching platform 102 may already have the complexity thresholds and corresponding caching rules. In these instances, the first metaverse host system 106 may not send the complexity thresholds and corresponding caching rules to the dynamic caching platform 102.

At step 222, the dynamic caching platform 102 may receive the complexity thresholds and the corresponding caching rules from the first metaverse host system 106. For example, the dynamic caching platform 102 may receive the complexity thresholds and the corresponding caching rules via the communication interface 113 and while the second wireless data connection is established. In some examples, the dynamic caching platform 102 may additionally receive one or more commands directing the dynamic caching platform 102 to cache interaction information according to the caching rules.

At step 223, dynamic caching platform 102 may cache interaction information (e.g., user identification information, authentication information, account information, biometric information, and/or other information) based on the caching rules. In some instances, dynamic caching platform 102 may cache the interaction information based on or in receiving the one or more commands directing the dynamic caching platform 102 to cache interaction information according to the caching rules (e.g., as described further above at step 220). The interaction information cached by the dynamic caching platform 102 may be information necessary for the user to execute a specific task or tasks within the metaverse environment. These task or tasks may be executed by dynamic caching platform 102 in response to validation of the cached interaction information and/or user input (e.g., as described further below with respect to step 237).

At step 224, dynamic caching platform 102 may perform edge caching using the interaction information (e.g., user identification information, authentication information, account information, biometric information, and/or other information) based on the caching rules. In some instances, based on or in response to the caching rules, dynamic caching platform 102 may pair to an edge metaverse device (e.g., a virtual reality device, an augmented reality device, a computer device, a smartphone, and/or other devices capable of metaverse interaction). For example, dynamic caching platform 102 may cause communication, connect, link, and/or otherwise network the dynamic caching platform 102 and the edge metaverse device. Based on or in response to pairing the dynamic caching platform 102 and the edge metaverse device, the dynamic caching platform 102 may cache the interaction information using edge caching. For example, the client metaverse device 104 and the edge metaverse device may each establish a connection to a same metaverse environment (e.g., a metaverse environment hosted by first metaverse host system 106, and/or other environments). In these examples, the dynamic caching platform 102 may use the edge metaverse device to cache the interaction information for client metaverse device 104 (e.g., by caching the interaction information in intermediate storage in memory (e.g., internal memory) of the edge metaverse device).

In some instances, based on or in response to user input requesting a new metaverse environment (e.g., the metaverse environment hosted by second metaverse host system 108), the dynamic caching platform 102 may identify a new edge metaverse device corresponding to the new metaverse environment. In these instances, dynamic caching platform 102 may pair to the new edge metaverse device. For example, dynamic caching platform 102 may cause communication, connect, link, and/or otherwise network the dynamic caching platform 102 and the new edge metaverse device. Based on or in response to pairing the dynamic caching platform 102 and the new edge metaverse device, the dynamic caching platform 102 may cache the interaction information using edge caching.

Additionally or alternatively, in some examples the dynamic caching platform 102 may identify an edge server. The edge server may co-host the metaverse environment with a metaverse host (e.g., first metaverse host system 106) different from the host of the edge server. In these instances, the edge server may be managed by an institution (e.g., a financial institution, and/or other institution). Based on identifying the edge server, dynamic caching platform 102 may cause communication, connect, link, and/or otherwise network the dynamic caching platform 102 and the edge server. Based on the caching rules, the dynamic caching platform 102 may cache the interaction information at the edge serve.

At step 225, second metaverse host system 108 may establish a connection with dynamic caching platform 102. For example, second metaverse host system 108 may establish a fourth wireless data connection with the dynamic caching platform 102 to link the dynamic caching platform 102 with the second metaverse host system 108 (e.g., in preparation for sending a third information stream). In some instances, the second metaverse host system 108 may identify whether or not a connection is already established with the dynamic caching platform 102. If a connection is already established with the dynamic caching platform 102, the second metaverse host system 108 might not re-establish the connection. If a connection is not yet established with the dynamic caching platform 102, second metaverse host system 108 may establish the fourth wireless data connection as described above. In some examples, the second metaverse host system 108 may establish the connection with the dynamic caching platform 102 based on a request from client metaverse device 104. For example, client metaverse device 104 may have requested a change in the metaverse environment based on user input requesting a change in the metaverse environment. In some instances, second metaverse host system 108 may manage a new metaverse environment different from the metaverse environment managed by first metaverse host system 106. For example, the new metaverse environment may exist in a new metaverse (e.g., a metaverse managed by a recreational institution, or other institution). In other examples, second metaverse host system 108 may be the same system as first metaverse host system 106 and/or manage the same metaverse environment as first metaverse host system 106. For example, the user may have provided input to move the user's avatar to a different spatial location within the same metaverse, but with different properties than the first metaverse environment (e.g., a second virtual teller, different from a first virtual teller but managed by the same entity (e.g., a financial institution)).

Figure 2F:
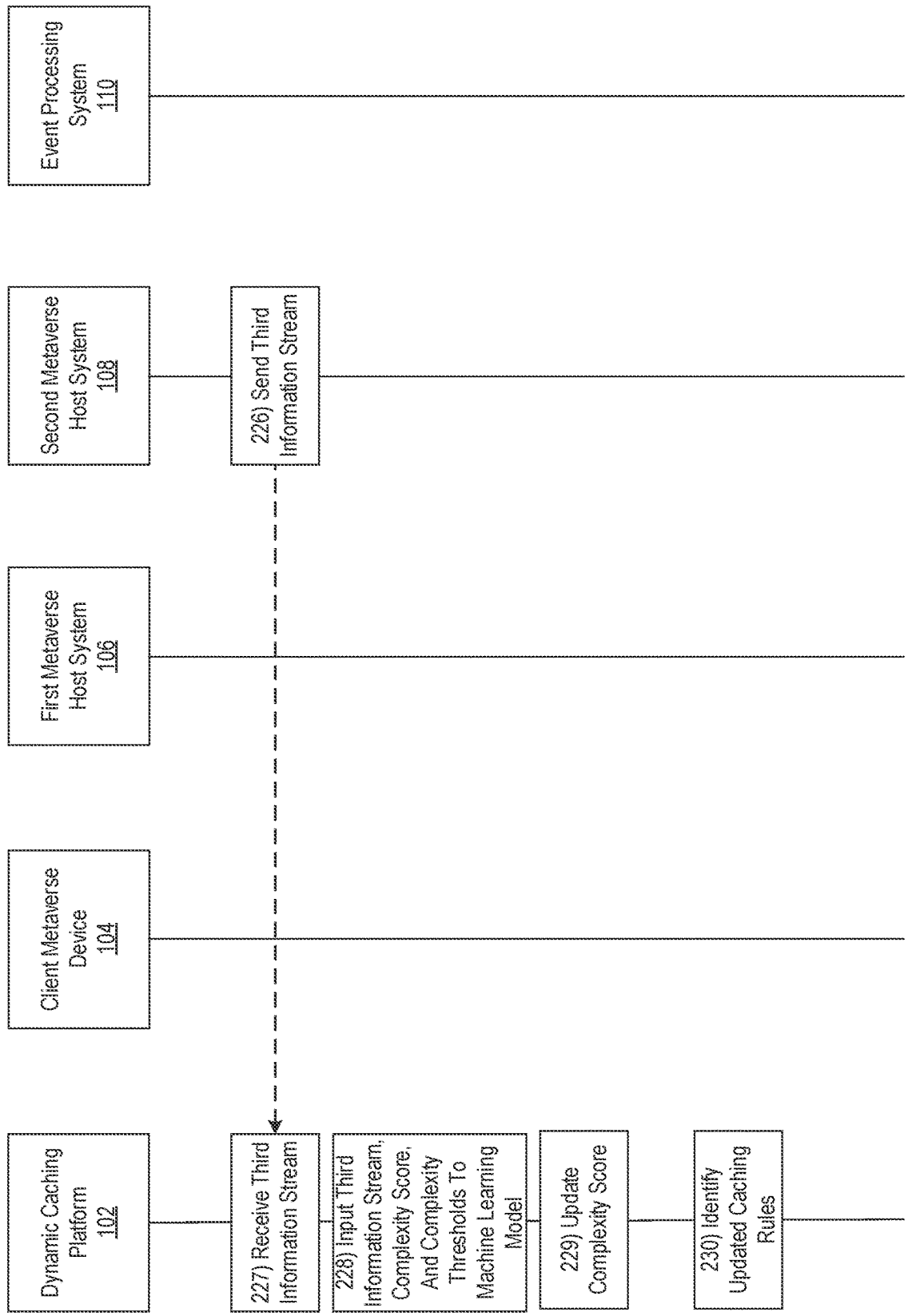

Referring to FIG. 2F, at step 226, once a connection has been established, the second metaverse host system 108 may send a third information stream to the dynamic caching platform 102. For example, the second metaverse host system 108 may send the third information stream via the communication interface 113 and while the fourth wireless data connection is established. In some examples, the second metaverse host system 108 may additionally send new complexity thresholds and corresponding caching rules to dynamic caching platform 102.

In some instances, in sending the third information stream, the second metaverse host system 108 may send positional characteristics of objects, rotational angles of objects, object dimensions, object mass, object friction, object pixel density, object color, object texture, object lighting, object behavior, metaverse temporal properties, metaverse user preferences, device capabilities, user metainformation, account information, biometric information, authentication information and/or other information. In some instances, the second metaverse host system 108 may have received the second information stream from a user, an employee/client of an enterprise organization (e.g., a financial institution), metaverse host rules, and/or other sources.

At step 227, dynamic caching platform 102 may receive the third information stream from second metaverse host system 108. For example, the dynamic caching platform 102 may receive the third information stream via the communication interface 113 and while the fourth wireless data connection is established. In some instances, the dynamic caching platform 102 may store the third information stream in internal memory of dynamic caching platform 102, and/or external memory. In some instances, once the dynamic caching platform 102 receives the third information stream, the dynamic caching platform 102 may continuously communicate with the second metaverse host system 108 to request updated information streams in order to update the complexity score and/or to synchronize updated caching rules. In some examples, dynamic caching platform 102 may additionally receive the new complexity thresholds and corresponding caching rules from second metaverse host system 108.

At step 228, the dynamic caching platform 102 may input the third information stream, the complexity score, the complexity thresholds and/or the new complexity thresholds into the machine learning model to update the complexity score and identify updated caching rules. In some instances, the complexity score may be based wholly or in part on the user's interactions with the metaverse environment. For example, users performing an active action (e.g., interacting with a metaverse object, such as a virtual account manager) may produce a higher complexity score than users performing a passive and/or no action (e.g., looking from side to side in a virtual reality metaverse environment). Additionally or alternatively, the complexity score may be based wholly or in part on properties corresponding to the metaverse environment. For example, the complexity score generated may increase or decrease based on the number of active users of the metaverse environment, the resources of the metaverse host system (e.g. second metaverse host system 108), the processing capacity of the client device (e.g. client metaverse device 104), and/or other properties.

At step 229, the dynamic caching platform 102 may update the complexity score. For example, the dynamic caching platform 102 may update the complexity score using the machine learning model. In updating the complexity score, the machine learning model may update the complexity score as an integer value, a decimal value, an alphanumeric representation, a percentage value, and/or other values. In some instances, the dynamic caching platform 102 may store the updated complexity score in internal memory of dynamic caching platform 102, and/or external memory. In some examples, the dynamic caching platform 102 may train the machine learning model to employ a complexity update algorithm to determine the updated complexity score. In some instances, the complexity update algorithm may use some or all of the third information stream and the complexity score in calculating an updated complexity score. For example, the dynamic caching platform 102 may execute the following complexity update algorithm:

$$\text{Complexity Score} + \frac{(\text{Difference in active users} + \text{Difference in user distance to metaverse object})}{(\text{User device processing power})} = \text{Updated Complexity Score}.$$

The dynamic caching platform 102 may additionally update the NFT certificate corresponding to the complexity score. In updating the NFT certificate, the dynamic caching platform 102 may update the NFT certificate to reflect the updated complexity score.

At step 230, the dynamic caching platform 102 may identify updated caching rules. In identifying updated caching rules, the dynamic caching platform 102 may compare the updated complexity score to the complexity thresholds to determine whether or not the updated complexity score corresponds to a different threshold range than the previous complexity score. For example, the previous complexity score may have had a value of 5, the updated complexity score may have a value of 7, and the complexity thresholds may establish threshold ranges of 1-3, 4-6, and 7-9. The dynamic caching platform 102 may then identify that the updated complexity score corresponds to the third threshold range. The dynamic caching platform 102 may identify updated caching rules based on the threshold range corresponding to the updated complexity score. In some instances, based on identifying that the updated complexity score does not correspond to a different threshold range than the previous complexity score, the updated caching rules may be the same as the previous caching rules. For example, the previous complexity score may have had a value of 5, the updated complexity score may have a value of 6, and the complexity thresholds may establish threshold ranges of 1-3, 4-6, and 7-9. The dynamic caching platform 102 may then identify that both the previous complexity score and the updated complexity score correspond to the second threshold range. In some examples, based on identifying that the updated complexity score does correspond to a different threshold range than the previous complexity score, the updated caching rules may be different from the previous caching rules. In some instances, dynamic caching platform 102 may identify the updated caching rules using the caching rules received from the first metaverse host system 106 at step 222. In some examples, the dynamic caching platform 102 may identify the updated caching rules based on a smart contract corresponding to the second metaverse host system 108.

Additionally or alternatively, the dynamic caching platform 102 may identify the updated caching rules using the new caching rules received from the second metaverse host system 108 at step 226. The caching rules may comprise one or more of: directions to cache interaction information at a particular time, directions to cache interaction information at a particular location, directions to cache interaction information with a particular device, directions to utilize edge caching, directions to cache interaction information up to a particular capacity, directions to cache interaction information for a particular use case, and/or other directions.

Referring to FIG. 2G, at step 231, the dynamic caching platform 102 may cache interaction information (e.g., user identification information, authentication information, account information, biometric information, and/or other information) based on the caching rules. For example, the dynamic caching platform 102 may cache authentication information in temporary local storage (e.g., memory of client metaverse device 104). The interaction information cached by the dynamic caching platform 102 may be information necessary for the user to execute a specific task or tasks within the metaverse environment. These task or tasks may be executed by dynamic caching platform 102 in response to validation of the cached interaction information and/or user input (e.g., as described further below with respect to step 237).

At step 232, the dynamic caching platform 102 may validate the cached interaction information. For example, the dynamic caching platform 102 may have cached interaction information corresponding to a particular task or tasks (e.g., accessing an account, such as one managed by a financial institution) that dynamic caching platform 102 predicts the user may execute in the metaverse environment, based on interaction information (e.g., the first information stream, the second information stream, the third information stream, and/or other information). The dynamic caching platform 102 may validate that the cached interaction information corresponds to the particular task or task. In doing so, the dynamic caching platform 102 may verify the accuracy of the cached interaction information, ownership of the cached interaction information, the presence of information required to execute the task or tasks, and/or other parameters required by a user to execute the task or tasks in the metaverse environment.

At step 233, the dynamic caching platform 102 may send the validated cached interaction information to client metaverse device 104. For example, the dynamic caching platform 102 may send the validated cached interaction information via the communication interface 113 and while the first wireless data connection is established. In some instances, the dynamic caching platform 102 may additionally send the client metaverse device 104 one or more commands directing the client metaverse device 104 to display information corresponding to the validated cached interaction information to the user.

At step 234, the client metaverse device 104 may receive the validated cached interaction information from the dynamic caching platform 102. For example, the client metaverse device 104 may receive the validated cached interaction information from the dynamic caching platform 102 via the communication interface 113 and while the first wireless data connection is established. In some examples, the client metaverse device 104 may additionally receive the one or more commands directing the client metaverse device 104 to display information corresponding to the validated cached interaction information to the user. Based on or in response to the one or more commands to display information corresponding to the validated cached interaction information, the client metaverse device 104 may display a verification interface. In some instances, the verification interface may be configured to receive user input through the client metaverse device 104.

Figure 3A:
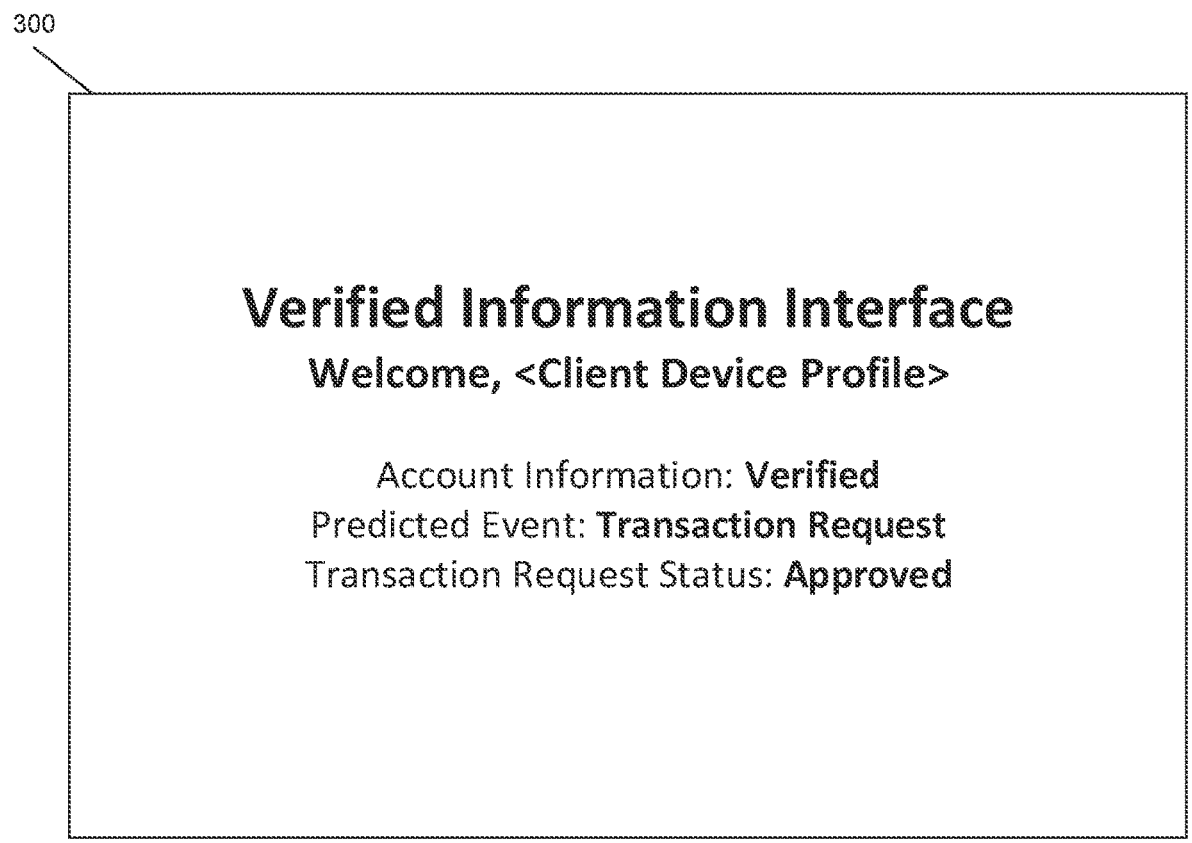
FIGS. 3A-3B depict illustrative graphical user interfaces for real-time dynamic caching for metaverse environments using NFTs in accordance with one or more example embodiments.

For example, in displaying a verification interface, the client metaverse device 104 may display a graphical user interface similar to validated information interface 300, which is illustrated in FIG. 3A. Referring to FIG. 3A, in some instances, the validated information interface 300 may include information corresponding to the validated cached interaction information. For example, the validated information interface 300 may include information corresponding to the validated cached interaction information such as what information was cached and validated (e.g., account information, user profile information, biometric information, and/or other information), the particular event and/or task that dynamic caching platform 102 predicted the user may execute, confirmation that the validated information allows execution of the predicted event and/or task, and/or other information.

Figure 3B:
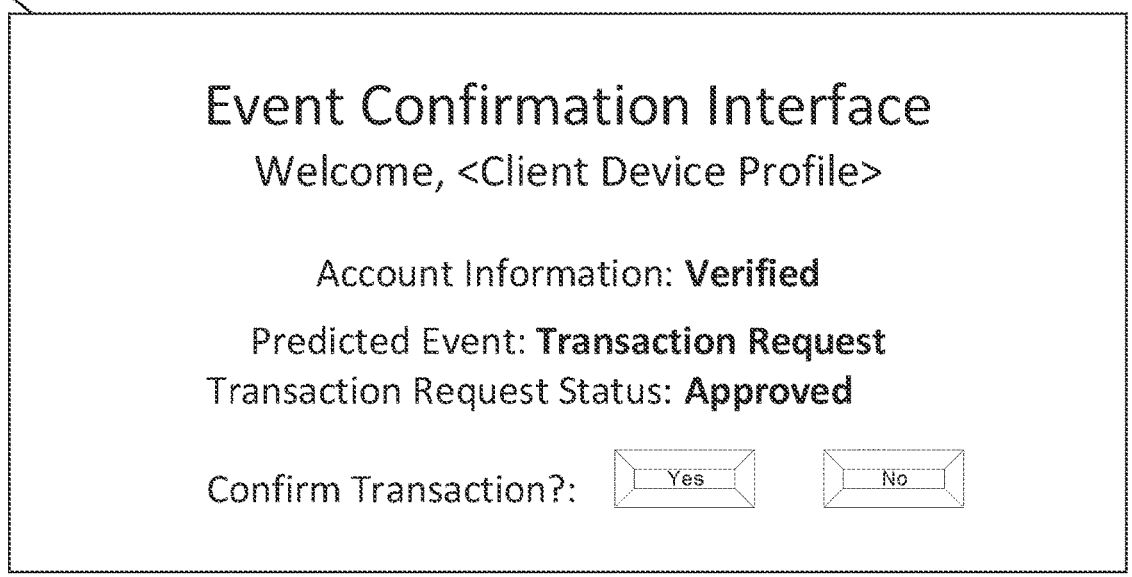

Additionally or alternatively, the client metaverse device 104 may display an event confirmation interface. For example, in displaying the event confirmation interface, the client metaverse device 104 may display a graphical user interface similar to event confirmation interface 310, which is illustrated in FIG. 3B. Referring to FIG. 3B, in some instances, the event confirmation interface 310 may include information corresponding to the validated cached interaction information. For example, the event confirmation interface 310 may include information corresponding to the validated cached interaction information such as what information was cached and validated (e.g., account information, user profile information, biometric information, and/or other information), the particular event and/or task that dynamic caching platform 102 predicted the user may execute, confirmation that the validated information allows execution of the predicted event and/or task, and/or other information. The event confirmation interface 310 may also display input mechanisms requesting user input. For example, the event confirmation interface 310 may display one or more of: a button or buttons, toggle or toggles, check box or boxes, and/or other interface elements. For example, as illustrated in FIG. 3B the input mechanisms may be buttons the user can select to decide whether or not to confirm execution of a predicted event and/or task.

With further reference to FIG. 2G, at step 235 the client metaverse device 104 may send an event processing request to dynamic caching platform 102. For example, the client metaverse device 104 may send the event processing request via the communication interface 113 and while the first wireless data connection is established. In some instances, in sending the event processing request, the client metaverse device 104 may send transaction requests, fund transfer requests, payment processing requests, request to change metaverse environments, requests to interact with a metaverse object, and/or other requests. In some examples, the client metaverse device 104 may send the event processing request based on or in response to receiving user input, such as input received via an event confirmation interface (e.g., event confirmation interface 310). In other instances, the client metaverse device 104 may send the event processing request automatically without user input.

At step 236, the dynamic caching platform 102 may receive the event processing request from client metaverse device 104. For example, the dynamic caching platform 102 may receive the event processing request via the communication interface 113 and while the first wireless data connection is established.

Figure 2H:
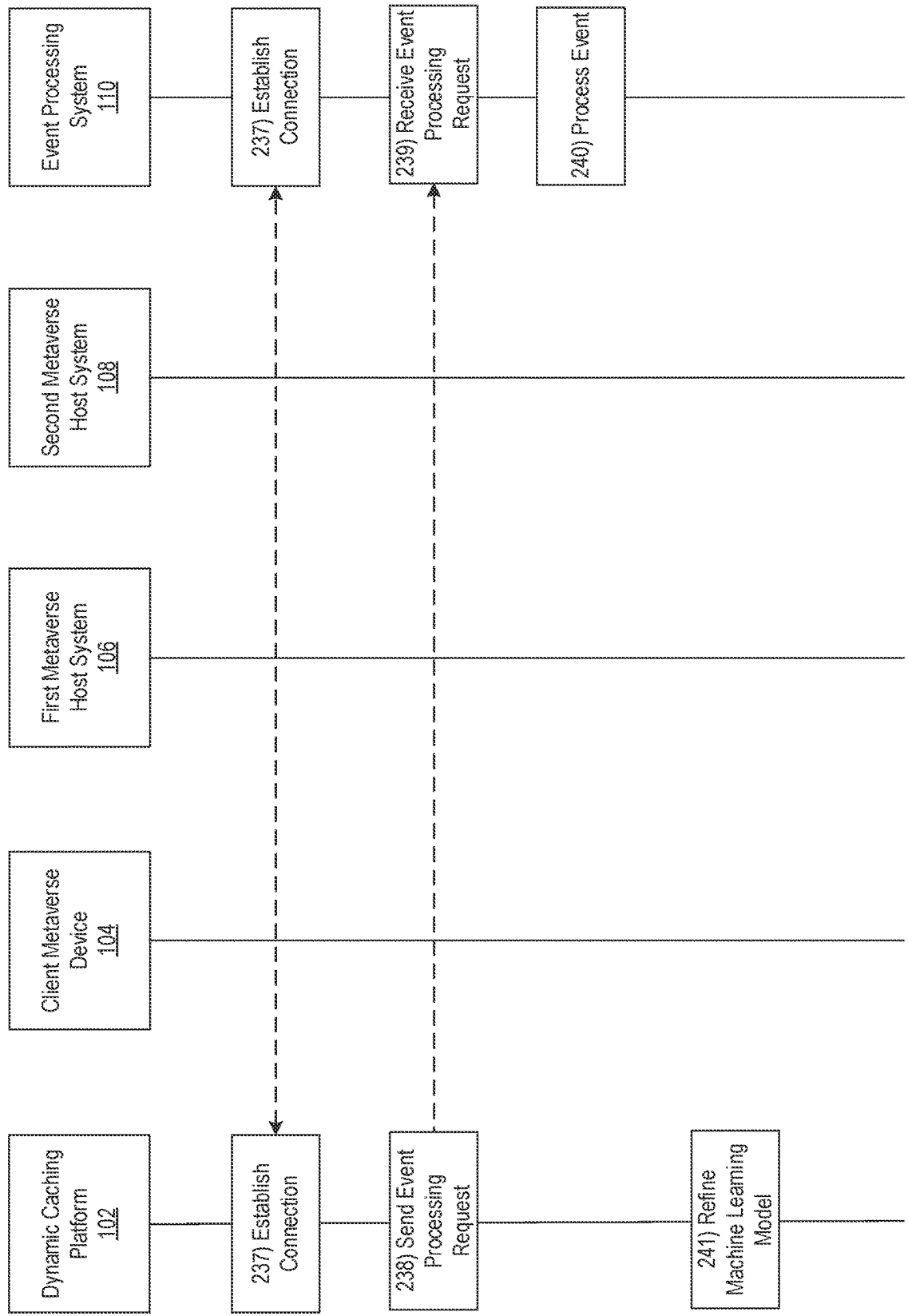

Referring to FIG. 2H, at step 237, dynamic caching platform 102 may establish a connection with event processing system 110. For example, dynamic caching platform 102 may establish a fifth wireless data connection with the event processing system 110 to link the dynamic caching platform 102 with the event processing system 110 (e.g., in preparation for sending an event processing request). In some instances, the dynamic caching platform 102 may identify whether or not a connection is already established with the event processing system 110. If a connection is already established with the event processing system 110, the dynamic caching platform 102 might not re-establish the connection. If a connection is not yet established with the event processing system 110, dynamic caching platform 102 may establish the fifth wireless data connection as described above. In some examples, the dynamic caching platform 102 may establish the connection with the event processing system 110 based on or in response to receiving the event processing request from client metaverse device 104, as described above at step 235.

At step 238, the dynamic caching platform 102 may send an event processing request to event processing system 110. For example, the dynamic caching platform 102 may send the event processing request via the communication interface 113 and while the fifth wireless data connection is established. In some instances, the dynamic caching platform 102 may send an event processing request received from client metaverse device 104 at step 235. In other examples, the dynamic caching platform 102 may send the event processing request without receiving a request from client metaverse device 104. In some instances, the dynamic caching platform 102 may additionally send one or more commands directing the event processing system 110 to process the event.

At step 239, the event processing system 110 may receive the event processing request from dynamic caching platform 102. For example, the event processing system 110 may receive the event processing request via the communication interface 113 and while the fifth wireless data connection is established. In some instances, the event processing system 110 may additionally receive the one or more commands directing the event processing system 110 to process the event.

At step 240, the event processing system 110 may process the event processing request. In some examples, the event processing system 110 may process the event processing request based on or in response to the one or more commands directing the event processing system 110 to process the event received at step 238. For example, the event processing system 110 may cause a transaction to be completed between two accounts (e.g., bank accounts, such as those managed by a financial institution), grant access to an account, process a payment, change metaverse environments, and/or other tasks/events.

At step 241, the dynamic caching platform 102 may refine the machine learning model based on interaction information (e.g., the first information stream, the second information stream, the third information stream, and/or other source of information), and the updated complexity score. In some instances, refining the machine learning model may include analyzing one or more of: user preferences, metaverse host preferences, metaverse spatial properties, metaverse temporal properties, and/or other information. Additionally or alternatively, refining the machine learning model may include inputting the interaction information (e.g., the third information stream) and the updated complexity score into the machine learning model. By inputting the interaction information and the updated complexity score into the machine learning model, the dynamic caching platform 102 may create an iterative feedback loop that may continuously and dynamically refine the machine learning model to improve its accuracy. For example, dynamic caching platform 102 may identify that a particular subset of the interaction information (e.g., information of the user's interaction with an object in the metaverse) had a particular effect on the complexity score (e.g., increasing, decreasing, multiplying, and/or other effect) when the machine learning model generated the updated complexity score. In these instances, the dynamic caching platform 102 may refine the machine learning model to update and/or generate complexity scores based on the particular subset of the interaction information in future iterations of the feedback loop. In doing so, the dynamic caching platform 102 may improve accuracy and effectiveness of the complexity score generation and update processes by the machine learning model, which may, e.g., result in more efficient training of models trained by the dynamic caching platform 102 (and may in some instances, conserve computing and/or processing power/resources in doing so).

Figure 4A:
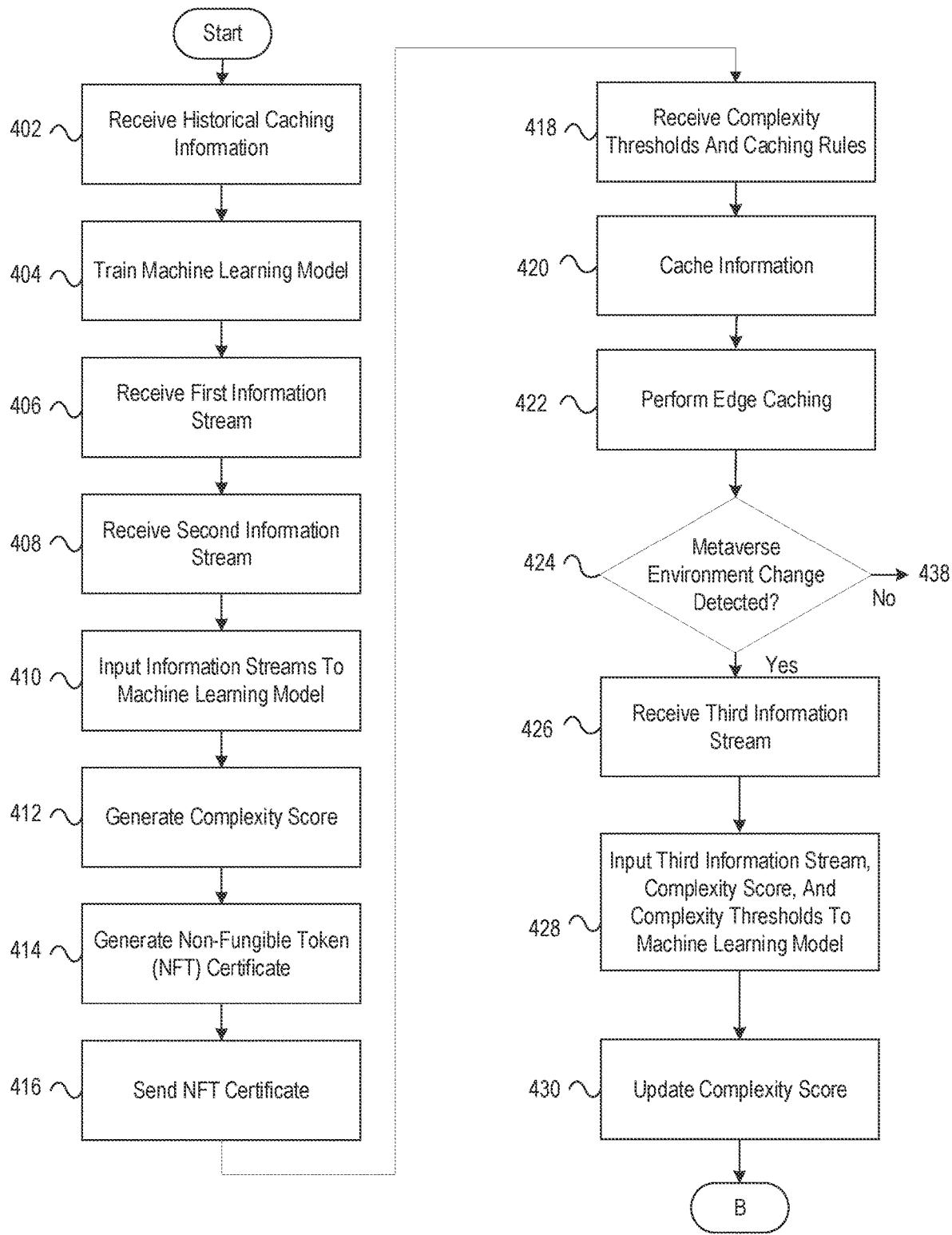
FIGS. 4A-4B depict illustrative methods for real-time dynamic caching for metaverse environments using NFTs in accordance with one or more example embodiments.
Figure 4B:
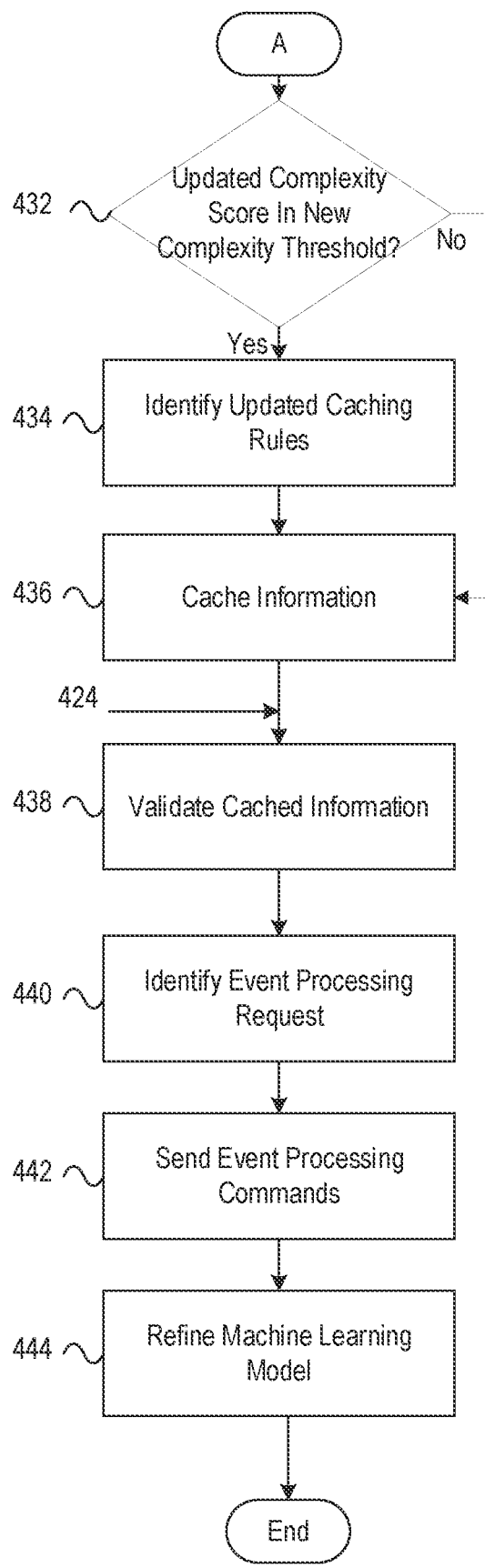

FIGS. 4A and 4B depict an illustrative method for real-time dynamic caching for interaction information using NFTs in accordance with one or more example embodiments. Referring to FIG. 4A, at step 402, a computing platform having at least one processor, a communication interface, and memory may receive historical complexity score information. At step 404, the computing platform may train a machine learning model. At step 406, the computing platform may receive a first information stream. At step 408, the computing platform may receive a second information stream. At step 410, the computing platform may input the first information stream and the second information stream into the machine learning model to output a complexity score. At step 412, the computing platform may generate a complexity score (e.g., an output of the machine learning model). At step 414, the computing platform may generate an NFT certificate. At step 416, the computing platform may send the NFT certificate to a client metaverse device. At step 418, the computing platform may receive complexity thresholds and caching rules. At step 420, the computing platform may cache interaction information based on the caching rules. At step 422, the computing platform may perform edge caching using the interaction information and based on the caching rules. At step 424, the computing platform may identify whether or not a metaverse environment change has occurred. Based on identifying that no metaverse environment change has occurred, the method may progress to step 438 in FIG. 4B. Based on identifying that a metaverse environment change has occurred, the method may progress to step 426. At step 426, the computing platform may receive a third information stream. At step 428, the computing platform may input the third information stream, the complexity score, and the complexity thresholds into the machine learning model. At step 430, the computing platform may update the complexity score.

Referring to FIG. 4B, at step 432, the computing platform may identify whether or not the updated complexity score occupies a new complexity threshold. Based on identifying that the complexity score does not occupy a new complexity threshold, the computing platform may progress to step 436 to cache interaction information. Based on identifying that the complexity score does occupy a new complexity threshold, the computing platform may progress to step 434 to update the caching rules. At step 434, the computing platform may identify updated caching rules. At step 436, the computing platform may cache interaction information based on the caching rules. At step 438, the computing platform may validate the cached interaction information. At step 440, the computing platform may identify an event processing request. At step 442, the computing platform may send an event processing request to an event processing system. At step 444, the computing platform may refine the machine learning model.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
    at least one processor;
    a communication interface communicatively coupled to the at least one processor; and
    memory storing computer-readable instructions that, when executed by the at least one processor, cause the computing platform to:
        receive, from one or more metaverse devices, interaction information, wherein the interaction information comprises information of interactions between a user and a metaverse environment;
        generate, based on the interaction information, a complexity score;
        compare the complexity score to one or more complexity thresholds, wherein:
            the one or more complexity thresholds define threshold ranges, and
            stored caching rules correspond to each threshold range;
        select, based on the comparison, a caching location based on stored caching rules corresponding to the complexity score;
        cache, at the selected caching location, the interaction information;
        generate a non-fungible token (NFT) certificate that includes the complexity score; and
        send the NFT certificate to a client metaverse device, of the one or more metaverse devices.

2. The computing platform of claim 1, wherein the memory stores additional computer-readable instructions that, when executed by the at least one processor, cause the computing platform to:
    train, based on historical complexity score information, a machine learning model to output complexity scores based on input of interaction information,
    wherein the generating the complexity score is further based on inputting the interaction information into the machine learning model; and
    update, based on the complexity score and the interaction information, the machine learning model.

3. The computing platform of claim 2, wherein the additional computer-readable instructions, when executed by the at least one processor, further cause the computing platform to:
    receive, from a metaverse device, of the one or more metaverse devices, additional interaction information, wherein the additional interaction information comprises information of additional interactions between the user and the metaverse environment;
input the additional interaction information into the machine learning model to update the complexity score;
identify, using the machine learning model, updated caching rules based on the complexity score; and
cache the additional interaction information based on the updated caching rules.

4. The computing platform of claim 3, wherein the updated caching rules are determined by a smart contract corresponding to the metaverse device.

5. The computing platform of claim 3, wherein the additional computer-readable instructions, when executed by the at least one processor, further cause the computing platform to:
repeatedly request, from the one or more metaverse devices, updated interaction information, wherein the complexity score and the updated caching rules are continuously updated based on the updated interaction information.

6. The computing platform of claim 3, wherein the additional interaction information comprises one or more of:
positional characteristics of objects, rotational angles of objects, object dimensions, object mass, object friction, object pixel density, object color, object texture, object lighting, object behavior, metaverse temporal properties, metaverse user preferences, device capabilities, user metainformation, account information, biometric information, or authentication information.

7. The computing platform of claim 1, wherein the interaction information comprises one or more of:
avatar mesh information, metaverse spatial properties, metaverse temporal properties, metaverse user preferences, device capabilities, user metainformation, account information, biometric information, authentication information, positional characteristics of objects, rotational angles of objects, object dimensions, object mass, object friction, object pixel density, object color, object texture, object lighting, or object behavior.

8. The computing platform of claim 1, wherein the client metaverse device comprises one or more of:
a virtual reality device, an augmented reality device, a computer device, or a smartphone device.

9. The computing platform of claim 1, wherein the selected caching location comprises an edge metaverse device and wherein the memory stores additional computer-readable instructions that, when executed by the at least one processor, cause the computing platform to:
pair the computing platform to the edge metaverse device; and
cache, using edge caching and based on the stored caching rules corresponding to the complexity score, the interaction information.

10. The computing platform of claim 1, wherein the stored caching rules corresponding to the complexity score comprise one or more of:
directions to cache interaction information at a particular time, directions to cache interaction information at a particular location, directions to cache interaction information with a particular device, directions to utilize edge caching, directions to cache interaction information up to a particular capacity, or directions to cache interaction information for a particular use case.

11. The computing platform of claim 1, wherein the memory stores additional computer-readable instructions that, when executed by the at least one processor, cause the computing platform to:
identify that an event processing request has been received from the user within the metaverse environment; and
send, based on validation of the cached interaction information, one or more commands directing an event processing system to process a requested event, wherein sending the one or more commands directing the event processing system to process the requested event causes the event processing system to process the requested event.

12. A method comprising:
at a computing device comprising at least one processor, a communication interface, and memory:
receiving, from one or more metaverse devices, interaction information, wherein the interaction information comprises information of interactions between a user and a metaverse environment;
generating, based on the interaction information, a complexity score;
comparing the complexity score to one or more complexity thresholds, wherein:
the one or more complexity thresholds define threshold ranges, and
stored caching rules correspond to each threshold range;
selecting, based on the comparison, a caching location based on stored caching rules corresponding to the complexity score;
caching, at the selected caching location, the interaction information; and
generating a non-fungible token (NFT) certificate that includes the complexity score; and
sending the NFT certificate to a client metaverse device, of the one or more metaverse devices.

13. The method of claim 12, further comprising:
training, based on historical complexity score information, a machine learning model to output complexity scores based on input of interaction information,
wherein the generating the complexity score is further based on inputting the interaction information into the machine learning model; and
updating, based on the complexity score and the interaction information, the machine learning model.

14. The method of claim 12, wherein the selected caching location comprises an edge metaverse device and wherein the method further comprises:
pairing the computing device to the edge metaverse device; and
caching, using edge caching and based on the stored caching rules corresponding to the complexity score, the interaction information.

15. One or more non-transitory computer-readable media storing instructions that, when executed by a computing platform comprising at least one processor, a communication interface, and memory, cause the computing platform to:
receive, from one or more metaverse devices, interaction information, wherein the interaction information comprises information of interactions between a user and a metaverse environment;
generate, based on the interaction information, a complexity score;

compare the complexity score to one or more complexity thresholds, wherein:
  the one or more complexity thresholds define threshold ranges, and
  stored caching rules correspond to each threshold range;
select, based on the comparison, a caching location based on stored caching rules corresponding to the complexity score; and
cache, at the selected caching location, the interaction information.

16. The one or more non-transitory computer-readable media of claim 15, storing additional instructions that, when executed, further cause the computing platform to:
  train, based on historical complexity score information, a machine learning model to output complexity scores based on input of interaction information,
  wherein the generating the complexity score is further based on inputting the interaction information into the machine learning model; and
  update, based on the complexity score and the interaction information, the machine learning model.

17. The one or more non-transitory computer-readable media of claim 15, wherein the selected caching location comprises an edge metaverse device and wherein the one or more non-transitory computer-readable media store additional instructions that, when executed, further cause the computing platform to:
  pair the computing platform to the edge metaverse device; and
caching, using edge caching and based on the stored caching rules corresponding to the complexity score, the interaction information.

18. The method of claim 13, further comprising:
receiving, from a metaverse device, of the one or more metaverse devices, additional interaction information, wherein the additional interaction information comprises information of additional interactions between the user and the metaverse environment;
inputting the additional interaction information into the machine learning model to update the complexity score;
identifying, using the machine learning model, updated caching rules based on the complexity score; and
caching the additional interaction information based on the updated caching rules.

19. The method of claim 18, wherein the updated caching rules are determined by a smart contract corresponding to the metaverse device.

20. The one or more non-transitory computer-readable media of claim 16, wherein the additional instructions, when executed, further cause the computing platform to:
  receive, from a metaverse device, of the one or more metaverse devices, additional interaction information, wherein the additional interaction information comprises information of additional interactions between the user and the metaverse environment;
  input the additional interaction information into the machine learning model to update the complexity score;
  identify, using the machine learning model, updated caching rules based on the complexity score; and
  cache the additional interaction information based on the updated caching rules.

* * * * *